United States Patent
Koishi et al.

[11] Patent Number: 6,157,518
[45] Date of Patent: *Dec. 5, 2000

[54] HEAD SLIDER HAVING A TRAPEZOIDAL SHAPE

[75] Inventors: Ryosuke Koishi; Seiji Yoneoka, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/965,545

[22] Filed: Nov. 6, 1997

[30] Foreign Application Priority Data

Mar. 17, 1997 [JP] Japan ................................. 9-063438
Aug. 5, 1997 [JP] Japan ................................. 9-210514

[51] Int. Cl.[7] ............................. G11B 5/60; G11B 21/21
[52] U.S. Cl. ................................. 360/235.5; 360/235.6; 360/236.1
[58] Field of Search .............................. 360/103, 102, 360/235.4, 235.5, 235.6, 235.8, 235.9, 236.1

[56] References Cited

U.S. PATENT DOCUMENTS

| | | | |
|---|---|---|---|
| 4,839,300 | 6/1989 | Kawahara et al. | 437/2 |
| 5,317,465 | 5/1994 | Chapin et al. | 360/103 |
| 5,377,063 | 12/1994 | Taniguchi et al. | 360/103 |
| 5,396,386 | 3/1995 | Bolasna et al. | 360/103 |
| 5,768,053 | 6/1998 | Yamanaka et al. | 360/103 |
| 5,831,791 | 11/1998 | Chhabra | 360/103 |

FOREIGN PATENT DOCUMENTS

| | | |
|---|---|---|
| 0198619 | 10/1986 | European Pat. Off. . |
| 0466502 | 1/1992 | European Pat. Off. . |
| 0640957 | 3/1995 | European Pat. Off. . |
| 0780836 | 6/1997 | European Pat. Off. . |
| 1-298585 | 12/1989 | Japan . |
| 4-228157 | 8/1992 | Japan . |
| 07141813 | 6/1995 | Japan . |
| 8-241513 | 9/1996 | Japan . |
| 8-279131 | 10/1996 | Japan . |

Primary Examiner—William R. Korzuch
Attorney, Agent, or Firm—Greer, Burns & Crain, Ltd.

[57] ABSTRACT

A magnetic head slider includes a pair of rails formed on a disk opposing surface opposed to a magnetic disk, each of the rails having a flat air bearing surface for generating a flying force during rotation of the disk, a slit formed between the pair of rails at their air inlet end portions, and a groove defined between the pair of rails which is continuous to the slit and wider than the slit, for expanding the air once compressed to generate a negative pressure. The magnetic head slider further includes an electromagnetic transducer formed on an air outlet end at a position where one of the rails is located. The slider has a trapezoidal shape such that its air inlet end is narrower than its air outlet end.

9 Claims, 27 Drawing Sheets

POSITIVE PRESSURE

NEGATIVE PRESSURE

HEAD SLIDER HAVING A TRAPEZOIDAL SHAPE

BACKGROUND OF THE INVENTION

1. Field of the Invention

The present invention relates generally to a flying magnetic head slider used in a magnetic disk drive, and more particularly to a negative-pressure slider intended for a low flying height.

2. Description of the Related Art

In a magnetic head slider for a recent magnetic disk drive, lowering the flying height is pursued to increase the recording density of a magnetic disk. Further, a slider having excellent flying stability is desired because a large acceleration is applied in an accessing direction to obtain a high access speed. Further, in a recent magnetic disk drive, a rotary positioner is widely used for the purposes of size reduction of the magnetic disk drive and simplification of a mechanism, and a negative-pressure slider with less variations in flying height due to changes in yaw angle is desired.

As a negative-pressure magnetic head slider having excellent flying stability, there has been proposed a slider having a pair of rails decreased in rail width from an air inlet end toward an air outlet end and defining a groove between the pair of rails to generate a negative pressure in the groove (Japanese Patent Laid-open No. 4-228157). FIG. 1A is a plan view of a conventional negative-pressure magnetic head slider disclosed in the above publication, and FIG. 1B is a perspective view of the slider shown in FIG. 1A. The slider denoted by reference numeral 2 has a rectangular shape as viewed in plan, and it has an air inlet end 2a and an air outlet end 2b.

A pair of rails 4 and 6 for generating a positive pressure are formed on a disk opposing surface of the slider 2. The rails 4 and 6 have flat air bearing surfaces (rails surfaces) 4a and 6a for generating a flying force during rotation of a disk, respectively. Tapering surfaces 4b and 6b are formed at the air inlet end portions of the rails 4 and 6, respectively. A groove 8 for expanding the air once compressed to generate a negative pressure is defined between the rails 4 and 6. An electromagnetic transducer 10 is formed on the air outlet end 2b of the slider 2 at a position where the rail 4 is located. A center rail 11 is formed between the rails 4 and 6 on the air inlet end 2a side.

Each of the rails 4 and 6 has a width larger at the air inlet end portion and the air outlet end portion and smaller at the intermediate portion, thereby suppressing variations in flying height due to changes in yaw angle. Further, by forming the tapering surfaces 4b and 6b at the air inlet end portions of the rails 4 and 6, variations in flying height due to deposition of dust can be suppressed. FIG. 1B is a perspective view of the slider 2 as viewed from the side of the rail surfaces, in which the broken arrows show a positive pressure acting on the slider 2, and the solid arrows show a negative pressure acting on the slider 2. The positive pressure is generated at the rail surfaces 4a and 6a, and the negative pressure is generated at the groove 8.

When the flying height of the slider 2 becomes 0.05 μm or less, the shape of the slider largely affects a flying condition. The above-mentioned conventional slider is rectangular in shape and each of the pair of substantially parallel rails has two wider portions at the air inlet end portion and the air outlet end portion. Accordingly, four peaks are present in a pressure distribution in flying of the slider. That is, the slider is supported at four points in flying. In such a case that the slider is supported at four points in flying, the shape of the slider largely affects a flying condition. That is, the flying condition of the slider is largely varied with variations in crown, camber, twist, etc. of the slider due to a manufacturing error.

SUMMARY OF THE INVENTION

It is therefore an object of the present invention to provide a head slider having good flying characteristics which can suppress variations in flying height due to a rail surface planarity tolerance in working a slider and variations in flying height due to a taper working tolerance.

In accordance with an aspect of the present invention, there is provided a head slider having an air inlet end and an air outlet end, comprising a pair of rails formed on a disk opposing surface opposed to a disk, each of said rails having a flat air bearing surface for generating a flying force during rotation of said disk; a slit defined between said pair of rails at their air inlet end portions; a groove defined between said pair of rails which is continuous to said slit and wider than said slit, for expanding air once compressed to generate a negative pressure; and a transducer formed on said air outlet end at a position where one of said rails is located; said slider having a trapezoidal shape such that said air inlet end is narrower than said air outlet end.

Since the head slider of the present invention has a trapezoidal shape such that the air inlet end is narrower than the air outlet end, the pair of rails are closer to each other at the air inlet end than at the air outlet end. Accordingly, three peaks are present in a pressure distribution in flying of the slider. That is, the slider is supported at three points in flying. Since the slider is supported at three points in flying, variations in flying height of the slider can be suppressed although the crown, camber, twist, etc. of the slider vary due to a manufacturing error. Accordingly, good flying characteristics of the slider can be realized.

Preferably, each rail has such a shape that the center of the air outlet end portion is positioned outside of a straight line connecting the center of the air inlet end portion and the center of the intermediate portion. Also preferably, each rail has a tapering surface for generating a positive pressure at the air inlet end portion, and the tapering surface has a width continuously decreasing from the air inlet end toward the air outlet end.

In accordance with another aspect of the present invention, there is provided a head slider having an air inlet end and an air outlet end, comprising a pair of rails formed on a disk opposing surface opposed to a disk, each of said rails having a flat air bearing surface for generating a flying force during rotation of said disk; a slit defined between said pair of rails at their air inlet end portions; a groove defined between said pair of rails which is continuous to said slit and wider than said slit, for expanding air once compressed to generate a negative pressure; and a transducer formed on said air outlet end at a position where one of said rails is located; said slider having a pair of substantially parallel side surfaces intersecting said air outlet end and a pair of inclined side surfaces extending from said pair of substantially parallel side surfaces to said air inlet end so as to continuously approach each other.

In accordance with a further aspect of the present invention, there is provided a head slider having an air inlet end and an air outlet end, comprising a pair of rails formed on a disk opposing surface opposed to a disk, each of said rails having a flat air bearing surface for generating a flying force during rotation of said disk; a rail connecting portion connecting said pair of rails at their air inlet end portions; a groove defined between said pair of rails for expanding air once compressed to generate a negative pressure; and a transducer formed on said air outlet end at a position where one of said rails is located; said slider having a trapezoidal shape such that said air inlet end is narrower than said air outlet end.

Preferably, the rail connecting portion has a tapering surface for generating a positive pressure at the air inlet portion, and the tapering surface has a width continuously decreasing from the air inlet end toward the air outlet end.

In accordance with a still further aspect of the present invention, there is provided a method of cutting a sticklike wafer having a given width and having a plurality of sliders formed in an array to separate said sliders so that each of said sliders has a trapezoidal shape, comprising the steps of providing a rotary cutter having a cutting blade formed over its outer circumference, said cutting blade having an inclination angle equal to the angle of an inclined side surface of said trapezoidal slider; making said sticklike wafer upright so that an air inlet end of each slider becomes an upper side, and positioning said sticklike wafer before said rotary cutter; and feeding said sticklike wafer to said rotary cutter in a substantially horizontal direction to thereby cut said sticklike wafer.

Alternatively, the sticklike wafer may be cut by vertically moving it to the rotary cutter so that a cutting position lies on a vertical line passing through the center of the rotary cutter.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
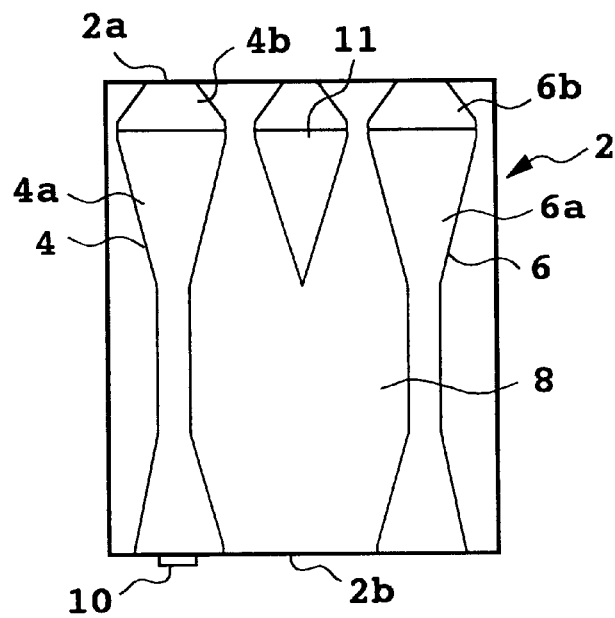
FIG. 1A is a plan view of a magnetic head slider in the prior art.
Figure 1B:
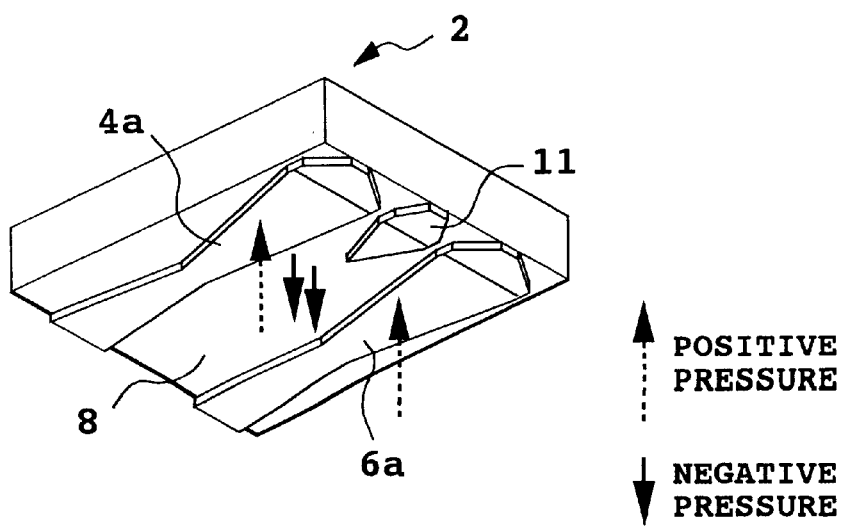
FIG. 1B is a perspective view of the slider shown in FIG. 1A in its flying condition.
Figure 2:
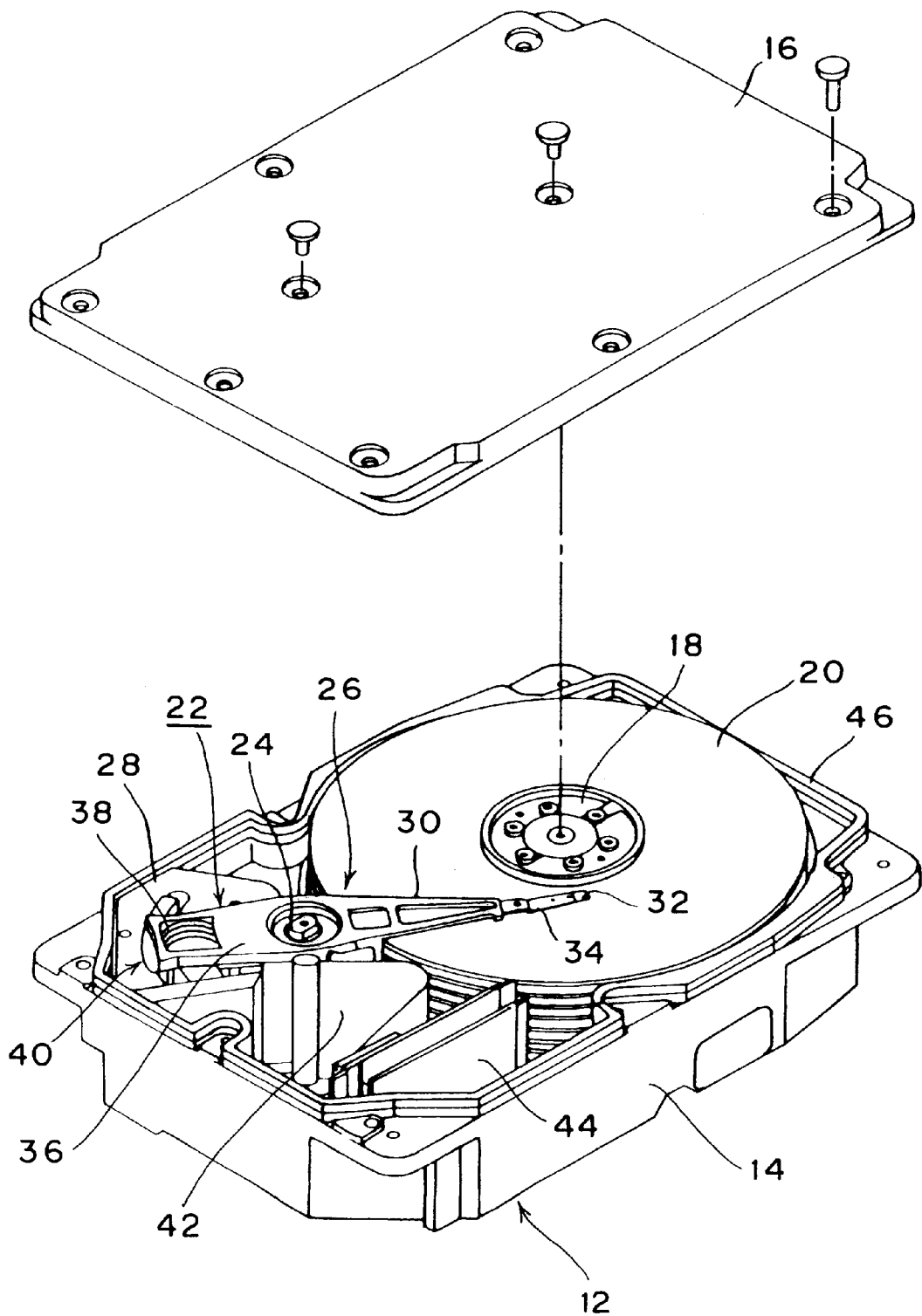
FIG. 2 is a perspective view of a magnetic disk drive.

Referring to FIG. 2, there is shown a perspective view of a magnetic disk drive in which a magnetic head slider according to the present invention is mounted. Reference numeral 12 denotes a housing (disk enclosure) consisting of a base 14 and a cover 16. A spindle hub (not shown) rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30.

A suspension 34 is fixed at its base end portion to a front end portion of each actuator arm 30. A magnetic head slider 32 is supported to a front end portion of the suspension 34.

A coil 38 is supported by the coil supporting member 36. The magnetic circuit 28 and the coil 38 inserted in a gap of the magnetic circuit 28 constitute a voice coil motor (VCM) 40.

Reference numeral 42 denotes a flexible printed circuit board (FPC) for taking a signal from an electromagnetic transducer mounted on the head slider 32. The flexible printed circuit board 42 is fixed at its one end by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 3:
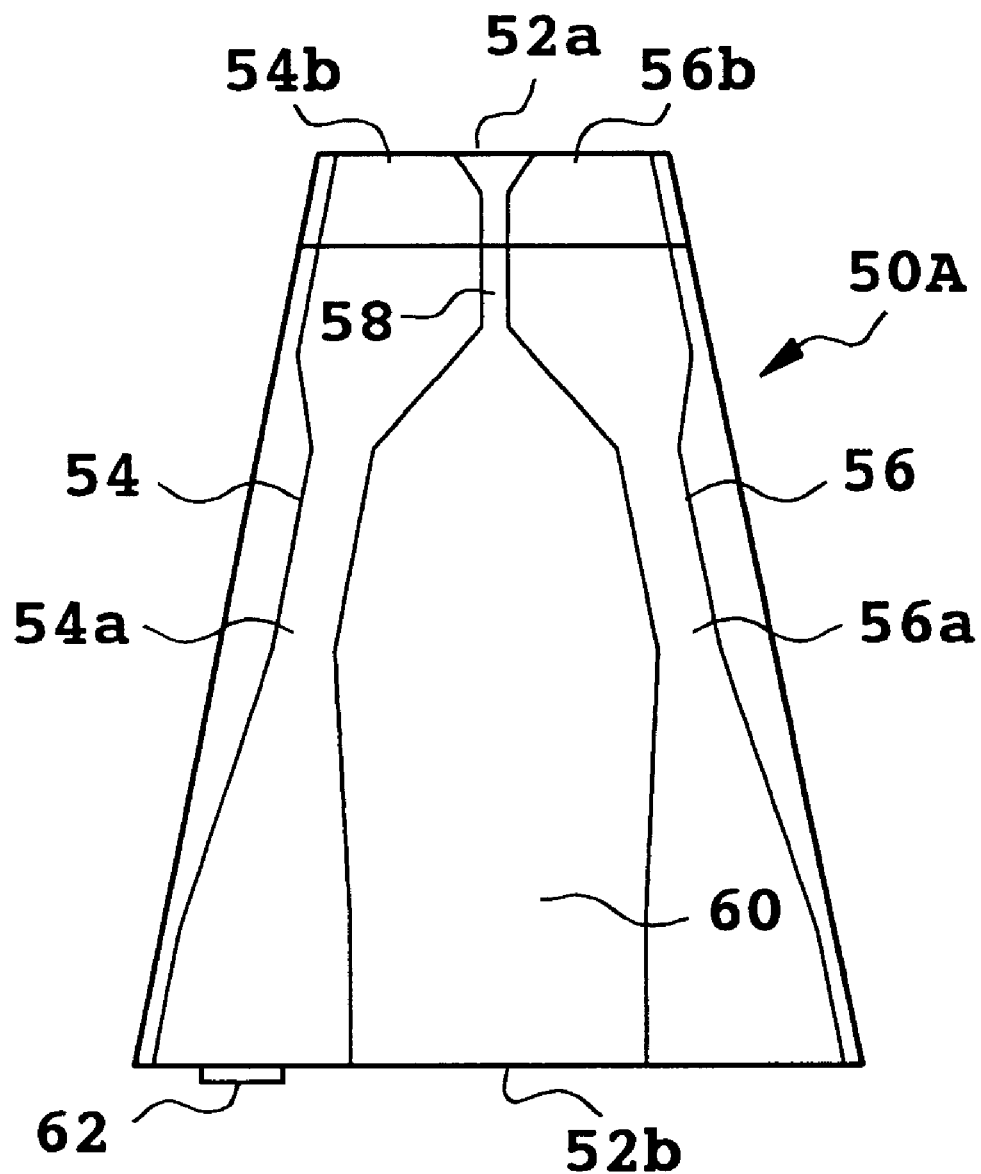
FIG. 3 is a plan view of a slider showing a first preferred embodiment of the present invention.
Figure 4:
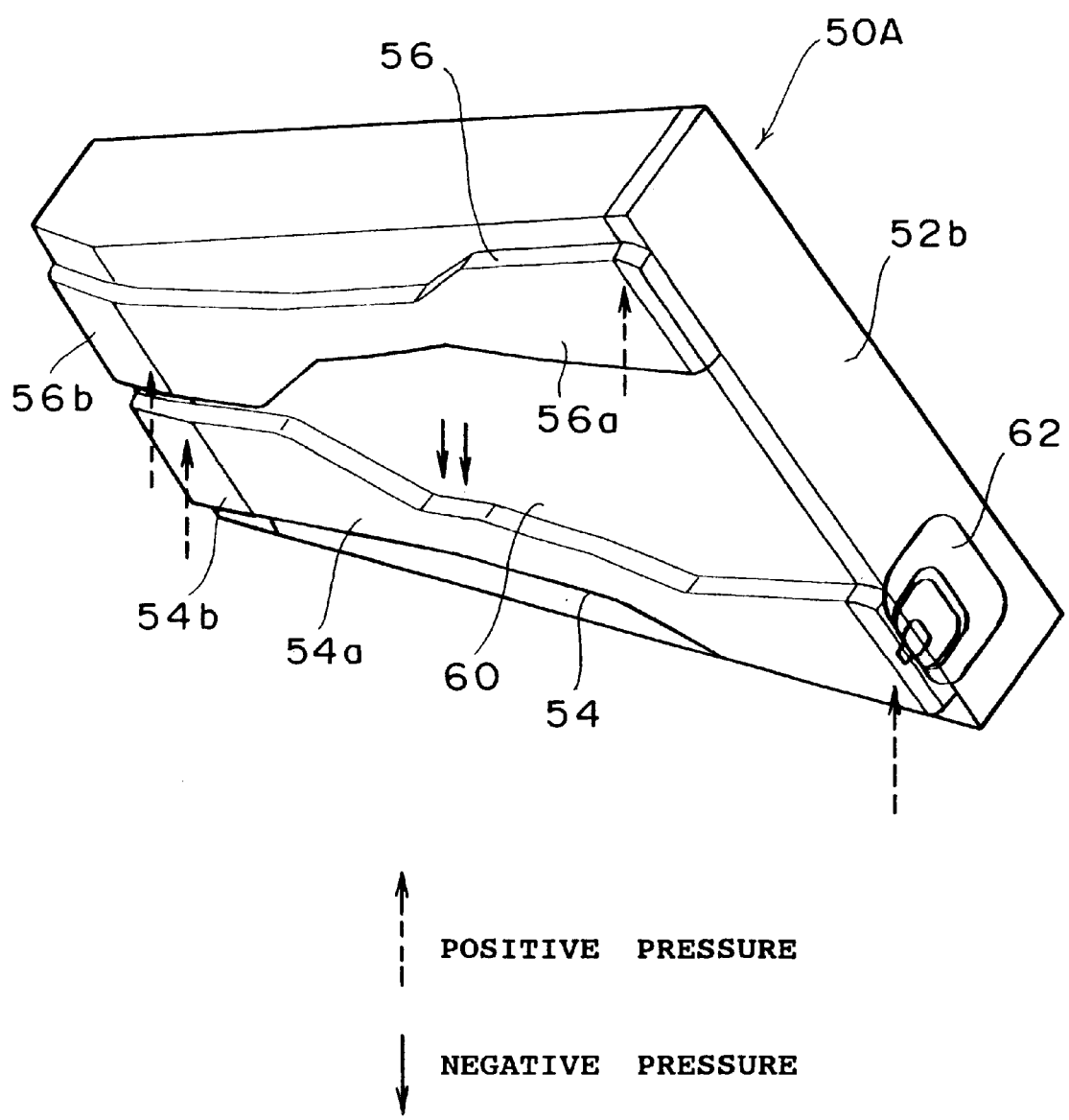
FIG. 4 is a perspective view of the slider shown in FIG. 3 in its flying condition.

FIG. 3 is a plan view of a magnetic head slider 50A showing a first preferred embodiment of the present invention, and FIG. 4 shows a perspective view of the magnetic head slider 50A in its flying condition. In this preferred embodiment and all subsequent preferred embodiments, substantially the same parts will be denoted by the same reference numerals. The magnetic head slider 50A has an air inlet end 52a and an air outlet end 52b, and has a trapezoidal shape as viewed in plan such that the air inlet end 52a is narrower than the air outlet end 52b. The magnetic head slider 50A is supported by the suspension 34 shown in FIG. 2.

A pair of rails 54 and 56 respectively having flat rail surfaces (air bearing surfaces) 54a and 56a are formed on a disk opposing surface of the magnetic head slider 50A. Tapering surfaces 54b and 56b are formed at air inlet end portions of the rails 54 and 56, respectively. Since the slider 50A is trapezoidal, the rails 54 and 56 are arranged closer to each other at their air inlet end portions, and a slit 58 is defined between the air inlet end portions of the rails 54 and 56. Further, a groove 60 for generating a negative pressure is defined between the rails 54 and 56. An electromagnetic transducer 62 is formed on the air outlet end 52b of the slider 50A at a position where the rail 54 is located.

The slider 50A is formed from $Al_2O_3$—TiC by first forming a plurality of electromagnetic transducers 62 on a wafer, next cutting the wafer into bars or sticks, next working a side surface of each bar to form a plurality of pairs of rails 54 and 56, and finally cutting the bar to obtain individual sliders 50A. The slider 50A has a size of 1.25 mm×0.25–0.75 mm (air inlet end)×1 mm (air outlet end) and a thickness of 0.3 mm. Each of the rails 54 and 56 has a minimum width of 100 μm or less. Accordingly, the rails 54 and 56 are formed by a photolithographic technique. That is, after applying a resist with a desired rail pattern to be formed, the wafer surface is cut by ion milling to form the slit 58 and the groove 60. The tapering surfaces 54b and 56b are formed by machining before or after forming the rails 54 and 56.

The tapering angle of each of the tapering surfaces 54b and 56b is set to preferably 0.5° to 4.0°, and the length of each of the tapering surfaces 54b and 56b is set to preferably 1/10 to 1/20 of the length of each of the rails 54 and 56. A positive pressure generated at the tapering surfaces 54b and 56b prevents deposition of dust on the rails 54 and 56 at their air inlet end portions.

As apparent from FIG. 4 showing a flying condition of the slider 50A, a positive pressure is generated at the rail surfaces (air bearing surfaces) 54a and 56a as shown by the broken arrows, and a negative-pressure attractive force is generated at the groove 60 as shown by the solid arrows. That is, the air once compressed at the slit 58 is expanded at the groove 60 to thereby generate a negative pressure at the groove 60.

Figure 5:
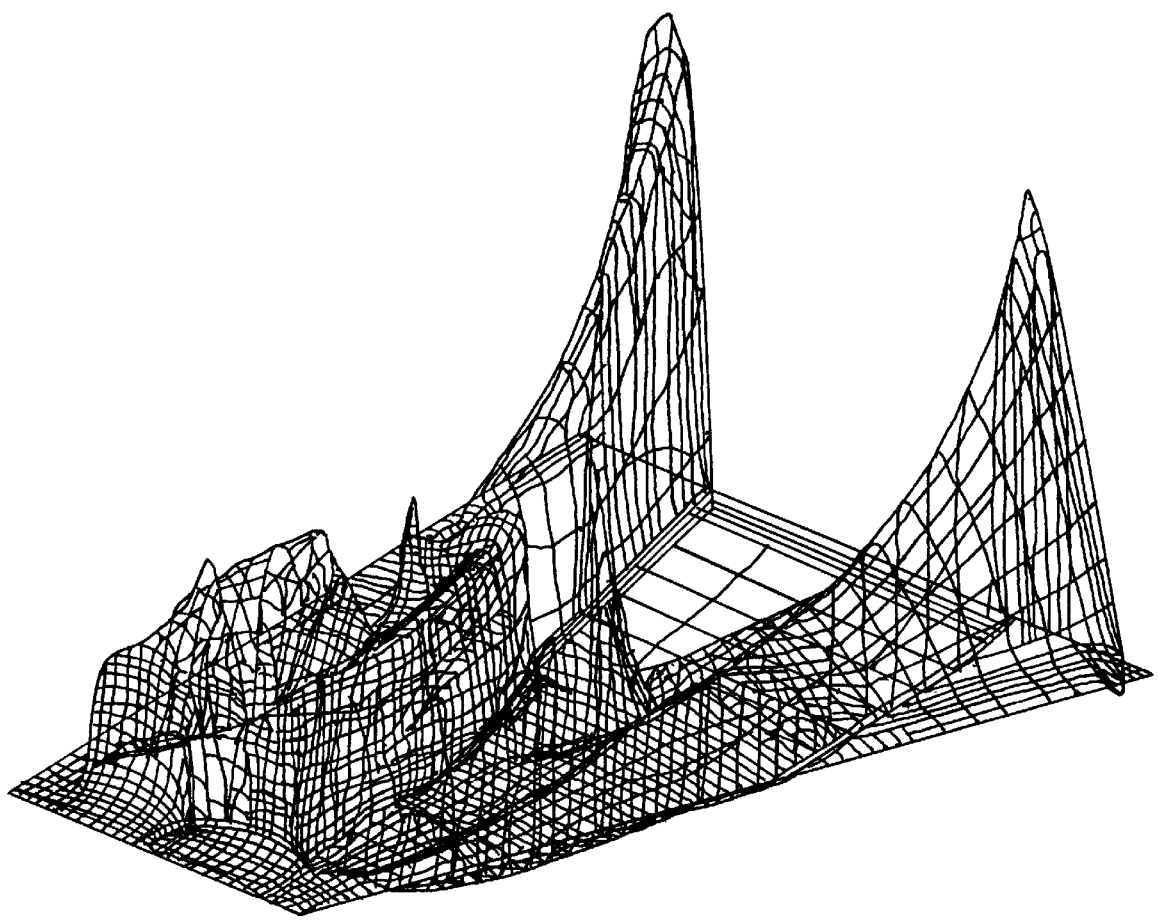
FIG. 5 is a view showing a pressure distribution of the slider shown in FIG. 3.

As apparent from FIG. 5 showing a pressure distribution on the slider 50A, three pressure peaks are obtained because the slider 50A has a trapezoidal shape. Accordingly, the slider 50A in its flying condition is supported at three points. Even when the crown, camber, twist, etc. of the slider 50A vary due to a working error, the rate of variations in flying height is low because the slider 50A is supported at three points. Further, since the slider 50A is trapezoidal, the mass of the slider 50A becomes about ½ to ¾ of the mass of the conventional slider with the same thickness. For example, the mass of the conventional slider is 1.757 mg, whereas the mass of the slider 50A of the first preferred embodiment is 0.984 to 1.378 mg. Accordingly, in the case that the slider 50A is mounted on a suspension having a mass of 1.161 mg, a resonance frequency can be increased by 3.8 to 13%.

Figure 6:
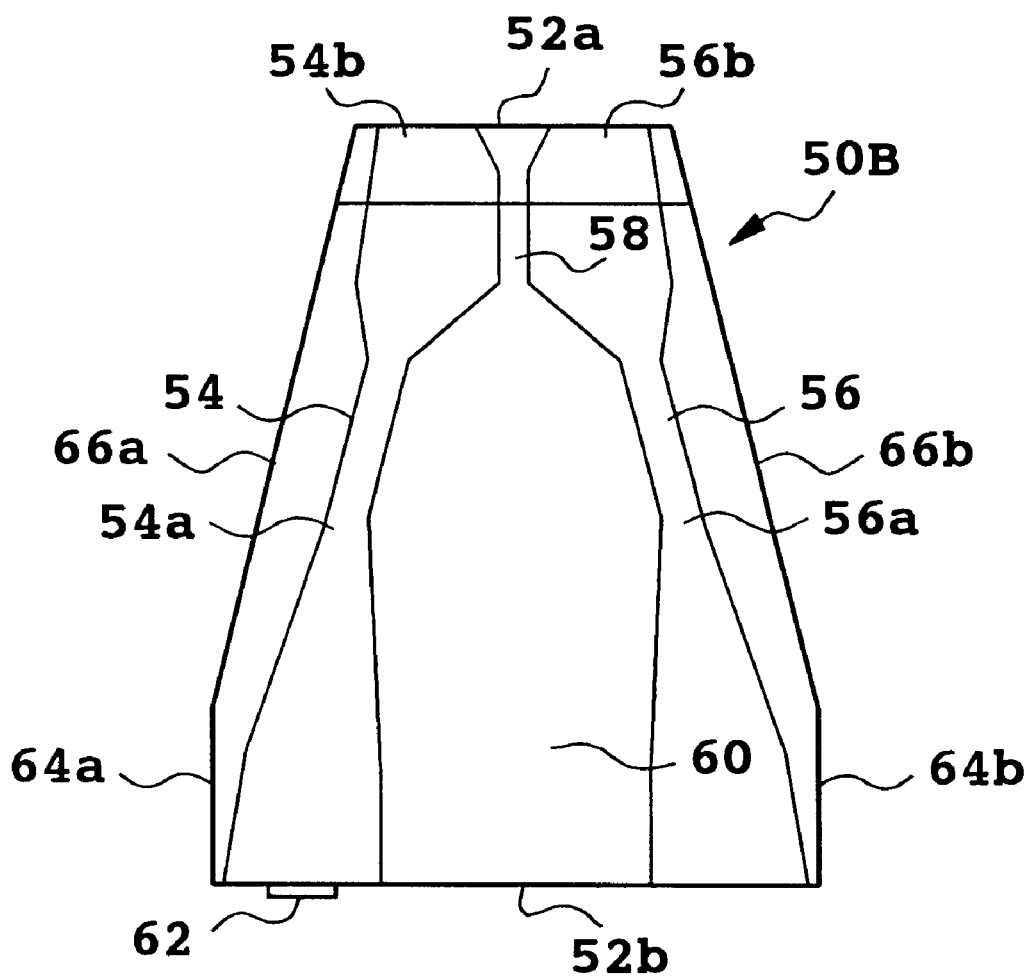
FIG. 6 is a plan view of a slider showing a second preferred embodiment of the present invention.

FIG. 6 is a plan view of a slider 50B showing a second preferred embodiment of the present invention. The slider 50B has a pair of parallel side surfaces 64a and 64b formed on the air outlet end 52b side and a pair of inclined side surfaces 66a and 66b connecting the side surfaces 64a and 64b to the air inlet end 52a. Since the slider 50B has the pair of parallel side surfaces 64a and 64b on the air outlet end 52b side, positioning of the slider 50B by lateral pushing in working the slider 50B can be facilitated. Further, since the angle of each corner portion of the slider 50B on the air outlet end 52b side is not acute, damage by the corner portions of the slider 50B upon collision can be reduced.

Figure 7:
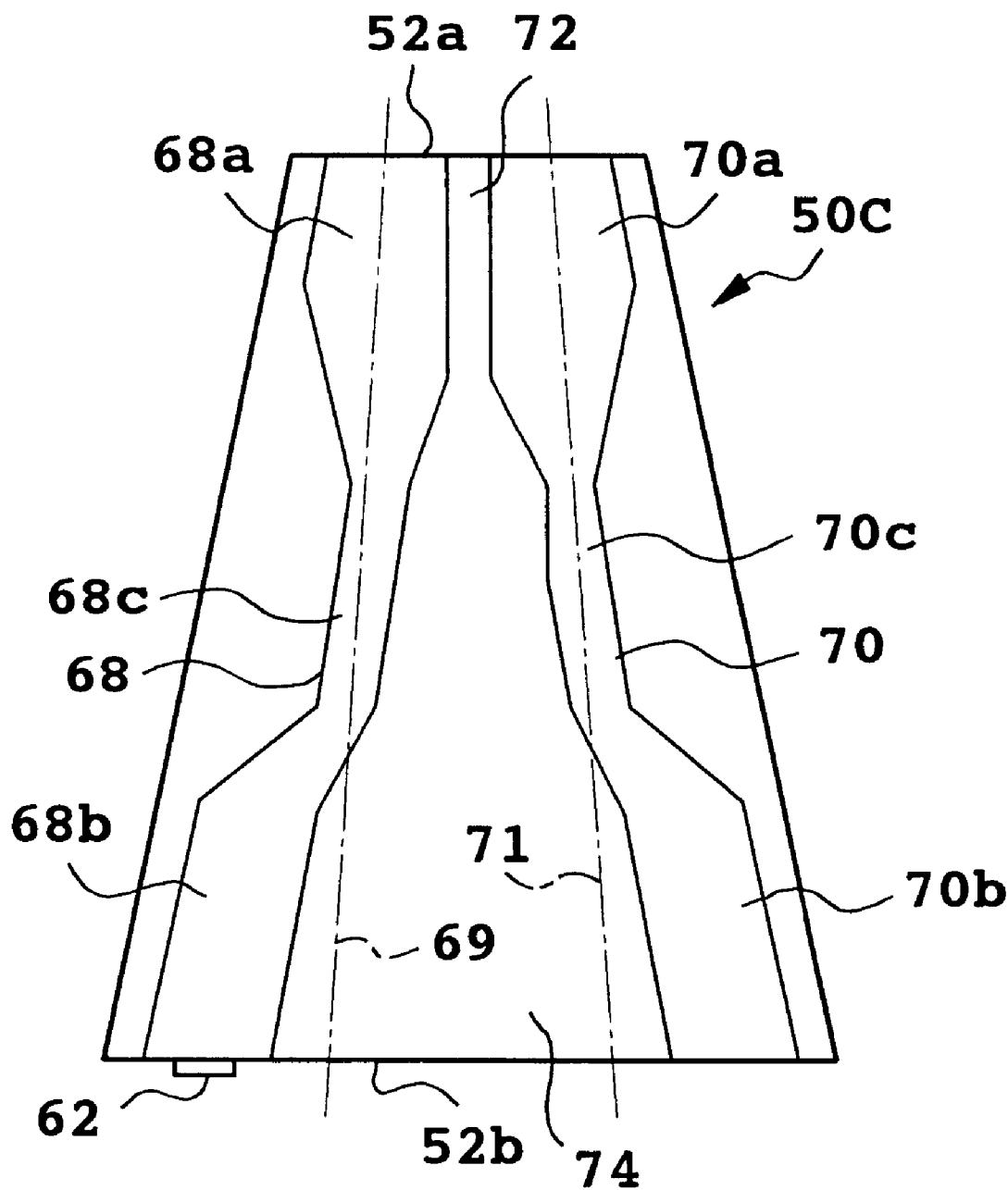
FIG. 7 is a plan view of a slider showing a third preferred embodiment of the present invention.

FIG. 7 is a plan view of a slider 50C showing a third preferred embodiment of the present invention. The slider 50C has a pair of rails 68 and 70. A slit 72 for compressing the air introduced and a groove 74 for expanding the air once compressed to generate a negative pressure are defined between the rails 68 and 70. The rail 68 includes an air inlet end portion 68a, an air outlet end portion 68b, and an intermediate portion 68c. The center of the air outlet end portion 68b is positioned outside of a straight line 69 connecting the center of the air inlet end portion 68a and the center of the intermediate portion 68c.

Similarly, the rail 70 includes an air inlet end portion 70a, an air outlet end portion 70b, and an intermediate portion 70c. The center of the air outlet end portion 70b is positioned outside of a straight line 71 connecting the center of the air inlet end portion 70a and the center of the intermediate portion 70c. Owing to such a specific shape of each of the rails 68 and 70, the current of air from the air inlet end 52a can be easily interrupted, so that a flying height can be reduced with a rail width required for stable flying being maintained.

Figure 8:
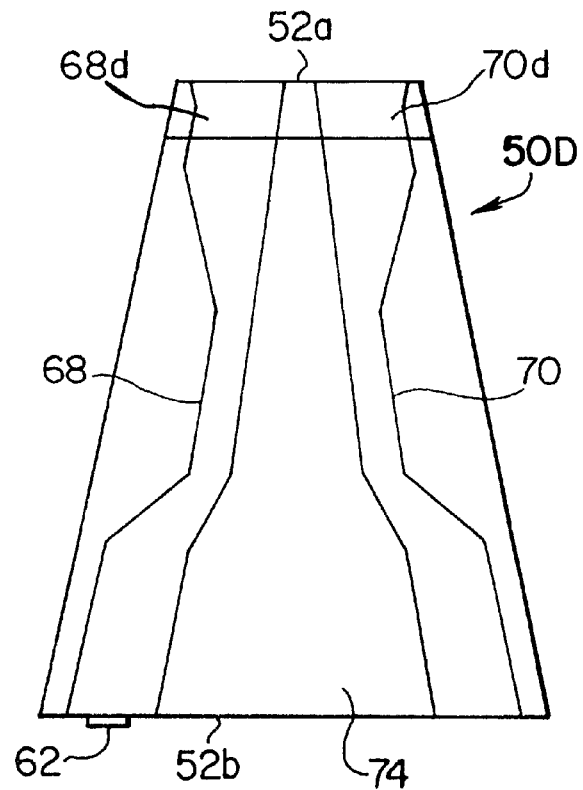
FIG. 8 is a plan view of a slider showing a fourth preferred embodiment of the present invention.

FIG. 8 is a plan view of a slider 50D showing a fourth preferred embodiment of the present invention. In this preferred embodiment, the width of each of tapering surfaces 68d and 70d of the rails 68 and 70 is decreased from the air inlet end 52a toward the air outlet end 52b. Accordingly, even if the length of each tapering surface varies due to a taper working tolerance, variations in flying height of the slider 50D can be reduced.

That is, the flying height increases with an increase in the length of each tapering surface. However, by decreasing the width of each tapering surface from the air inlet end 52a toward the air outlet end 52b, the flying height can be reduced to thereby cancel the increase in the flying height due to the increase in the length of each tapering surface.

Figure 9:
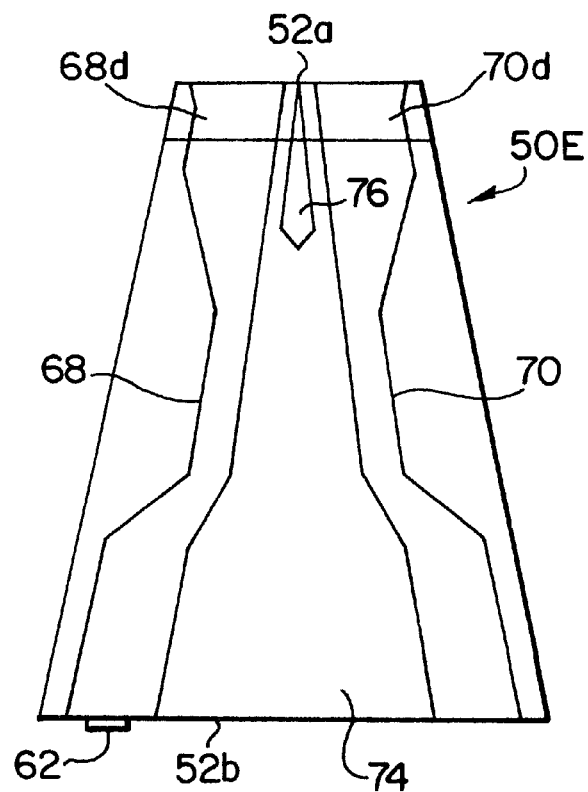
FIG. 9 is a plan view of a slider showing a fifth preferred embodiment of the present invention.

FIG. 9 is a plan view of a slider 50E showing a fifth preferred embodiment of the present invention. In this preferred embodiment, a center rail 76 is provided between the rails 68 and 70. The other configuration is similar to that shown in FIG. 8.

Figure 10:
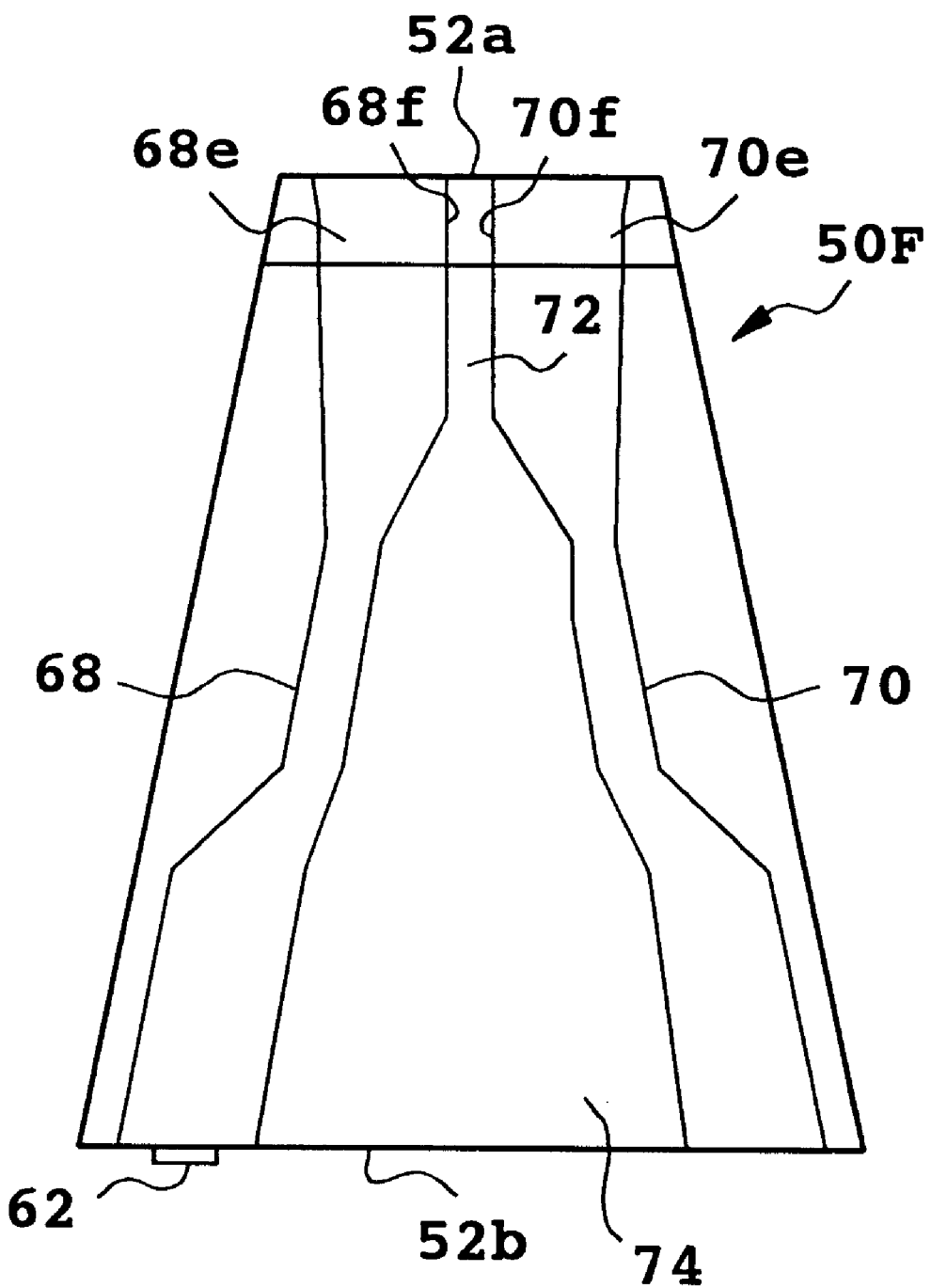
FIG. 10 is a plan view of a slider showing a sixth preferred embodiment of the present invention.

FIG. 10 is a plan view of a slider 50F showing a sixth preferred embodiment of the present invention. In this preferred embodiment, opposed inside edges 68f and 70f of the rails 68 and 70 defining the slit 72 are parallel to a longitudinally extending center line of the slider 50F. Additionally, the width of each of tapering surfaces 68e and 70e of the rails 68 and 70 is decreased from the air inlet end 52a toward the air outlet end 52b. Accordingly, like the fourth and fifth preferred embodiments, variations in flying height of the slider 50F can be reduced although the length of each tapering surface varies due to a taper working tolerance.

Figure 11:
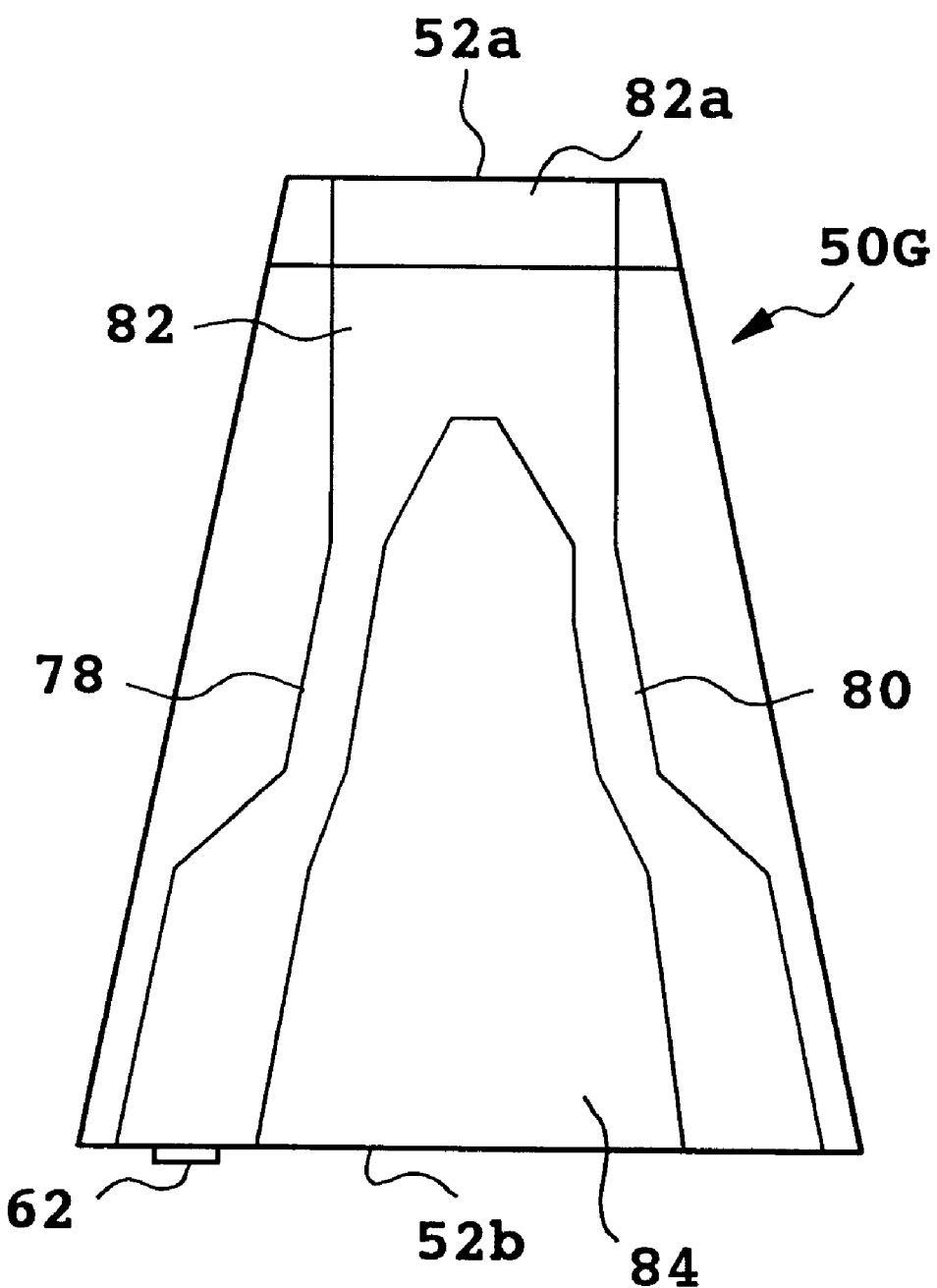
FIG. 11 is a plan view of a slider showing a seventh preferred embodiment of the present invention.

FIG. 11 is a plan view of a slider 50G showing a seventh preferred embodiment of the present invention. In this preferred embodiment, a pair of rails 78 and 80 are connected together by a rail connecting portion 82 formed on the air inlet end 52a side. That is, the rail shape of the slider 50G is an inverted V-shape with no slit defined between the rails 78 and 80. Accordingly, the air introduced from the air inlet end 52a is greatly compressed at the rail connecting portion 82, and the air thus compressed is next expanded at a groove 84, thereby easily generating a negative pressure. The rail connecting portion 82 has a tapering surface 82a on the air inlet end 52a side.

If such an inverted V-shape or an inverted U-shape is applied to the rail shape of the conventional rectangular slider, the width of the tapering surface is increased to result in generation of an excess positive pressure. Accordingly, it is difficult to realize a low flying height of the slider. To cope with this problem, it is necessary to reduce the width of the tapering surface. In this case, however, non-rail portions on the opposite sides of the tapering surface become wider in the conventional slider. As a result, in the case that the slider is tilted down at its air inlet end, the corners of the slider at its air inlet end come into contact with the magnetic disk.

In the slider 50G of this preferred embodiment, however, the width of the air inlet end 52a is smaller than that in the conventional slider because the slider 50G is trapezoidal. Accordingly, it is unnecessary to reduce the width of the tapering surface for the purpose of suppressing the positive pressure. As a result, the contact of the corners of the slider and the magnetic disk due to the tilting of the slider 50G can be avoided.

Figure 12:
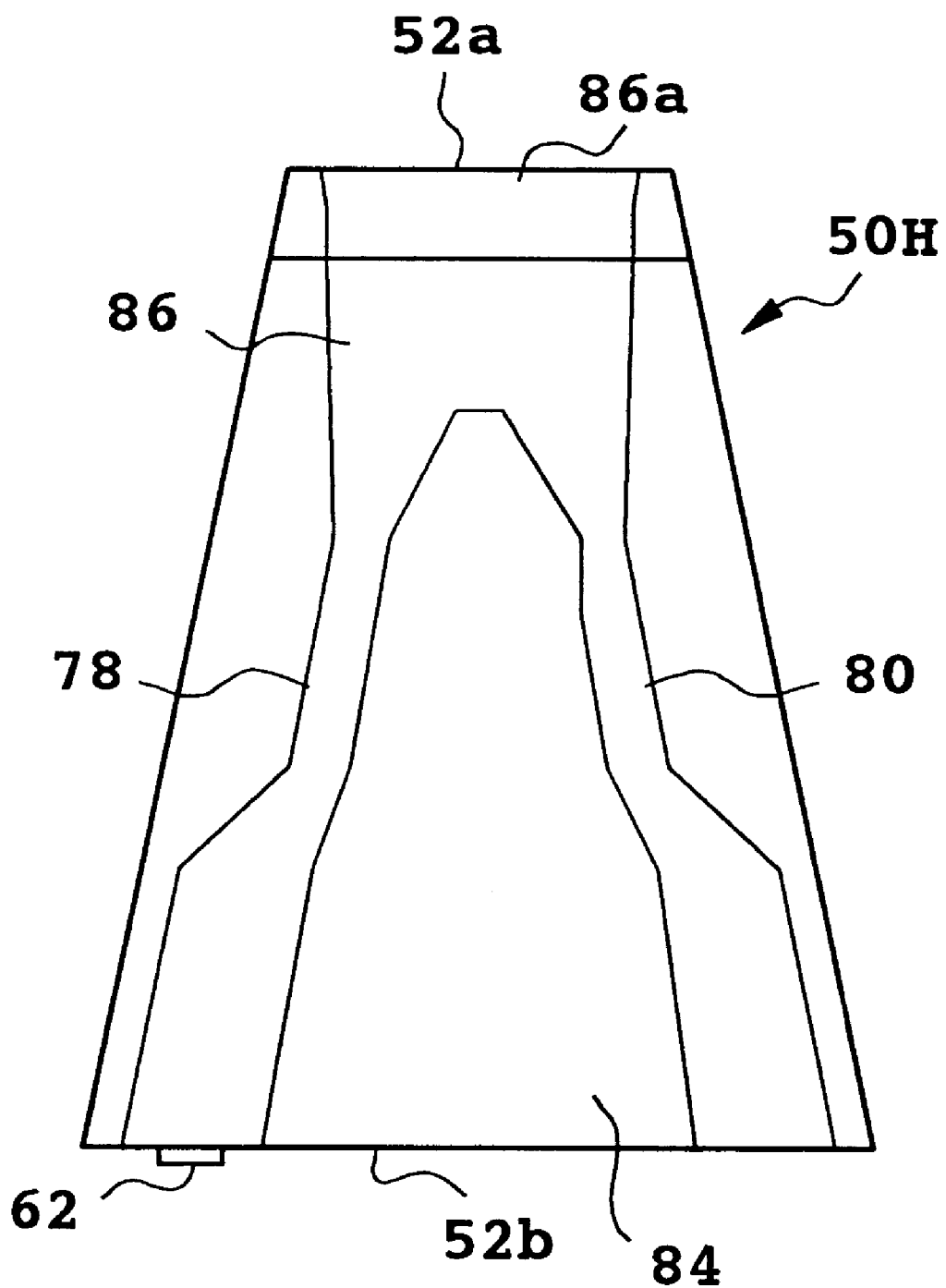
FIG. 12 is a plan view of a slider showing an eighth preferred embodiment of the present invention.

FIG. 12 is a plan view of a slider 50H showing an eighth preferred embodiment of the present invention. In this preferred embodiment, the width of a tapering surface 86a at a rail connecting portion 86 connecting the rails 78 and 80 is decreased from the air inlet end 52a toward the air outlet end 52b. Accordingly, even when the length of the tapering surface varies due to a taper working tolerance, variations in flying height of the slider 50H can be reduced.

Figure 13:
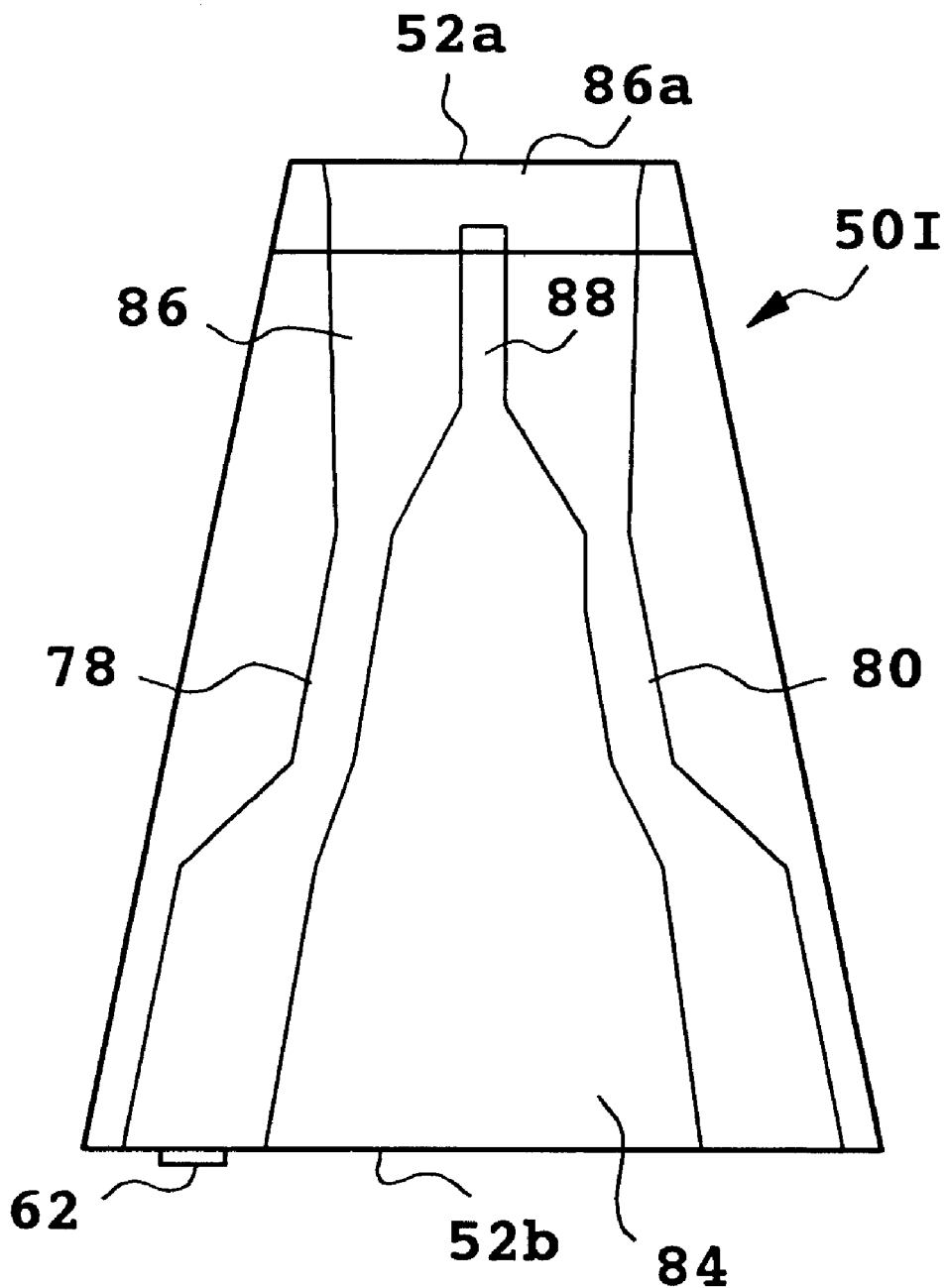
FIG. 13 is a plan view of a slider showing a ninth preferred embodiment of the present invention.

FIG. 13 is a plan view of a slider 50I showing a ninth preferred embodiment of the present invention. In this preferred embodiment, a slit 88 is formed at the rail connecting portion 86 so as to extend from the air inlet end 52b side to a part of the tapering surface 86a. Accordingly, the positive pressure at the rail connecting portion 86 can be suppressed to thereby easily achieve a low flying height of the slider 50I.

Figure 14:
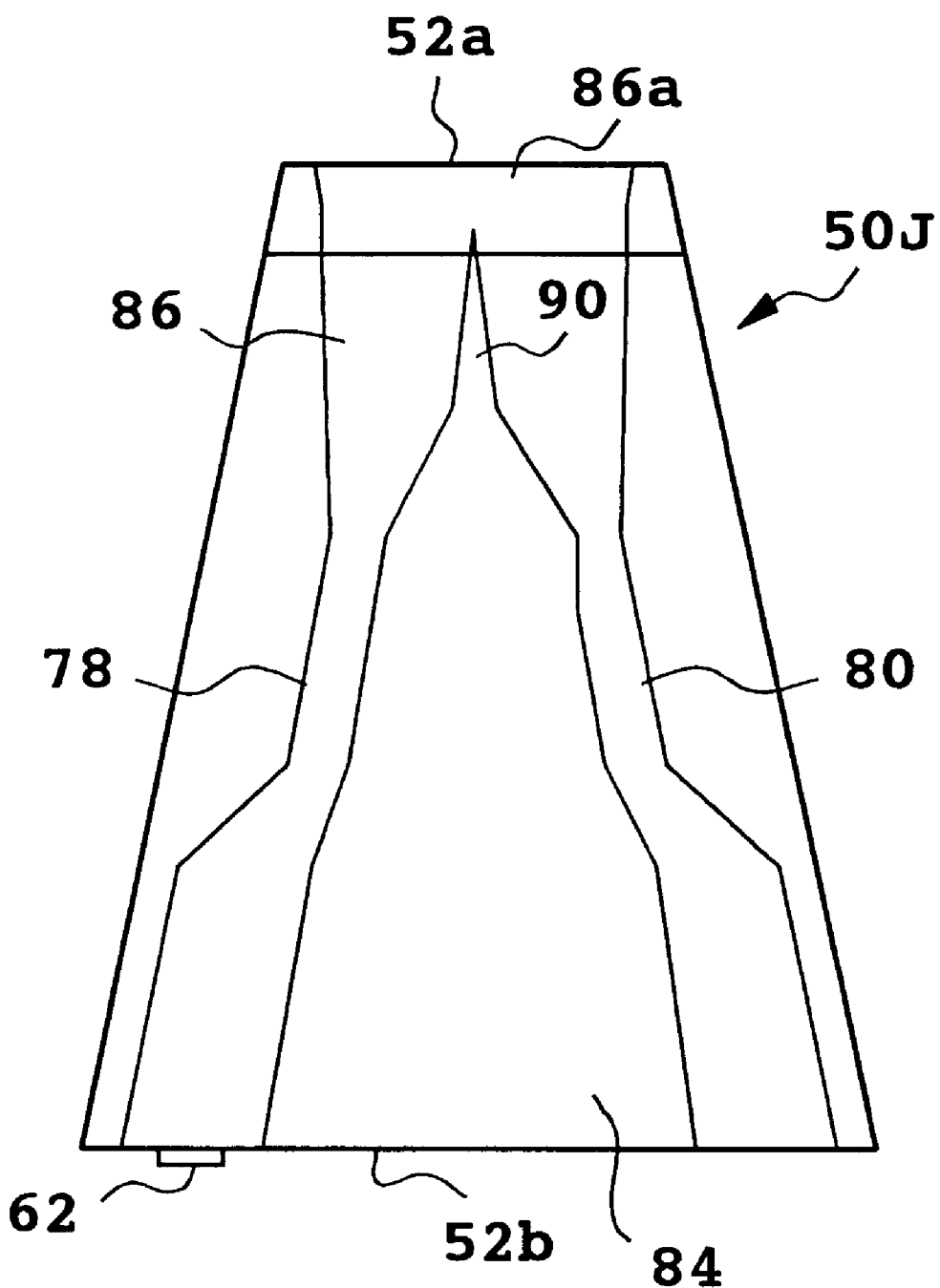
FIG. 14 is a plan view of a slider showing a tenth preferred embodiment of the present invention.

FIG. 14 is a plan view of a slider 50J showing a tenth preferred embodiment of the present invention. Like the slider 50I shown in FIG. 13, a slit 90 is formed at the rail connecting portion 86 so as to extend from the air outlet end 52b side to a part of the tapering surface 86a. In this preferred embodiment, the width of the slit 90 is gradually decreased from the air outlet end 52b side toward the air inlet end 52a side. As a result, a pair of rail portions each decreasing in width from the air inlet end 52a side toward the air outlet end 52b side can be easily formed at the rail connecting portion 86, and variations in flying height of the slider 50J can be reduced although the length of the tapering surface varies due to a taper working tolerance.

Figure 15A:
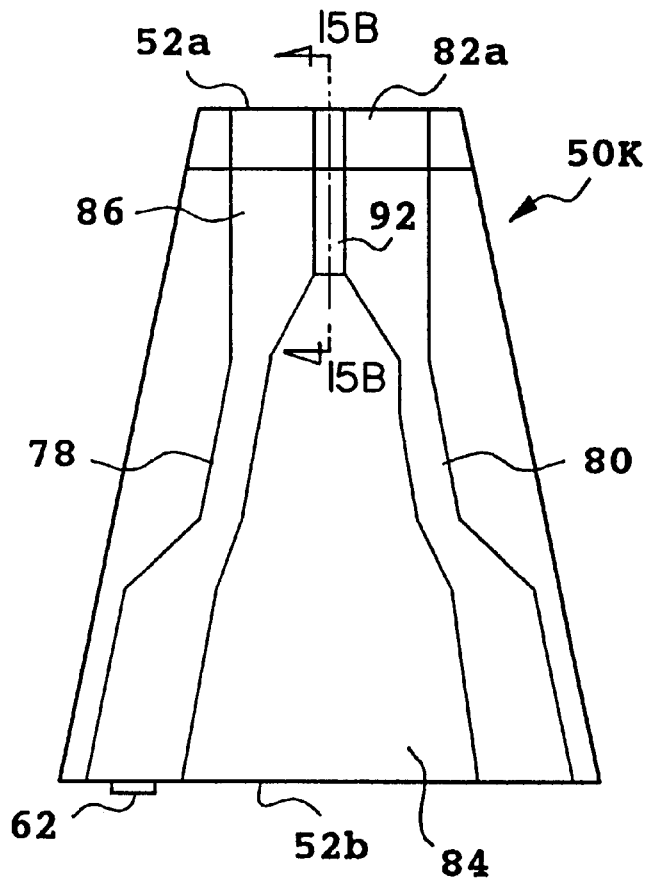
FIG. 15A is a plan view of a slider showing an eleventh preferred embodiment of the present invention.
Figure 15B:
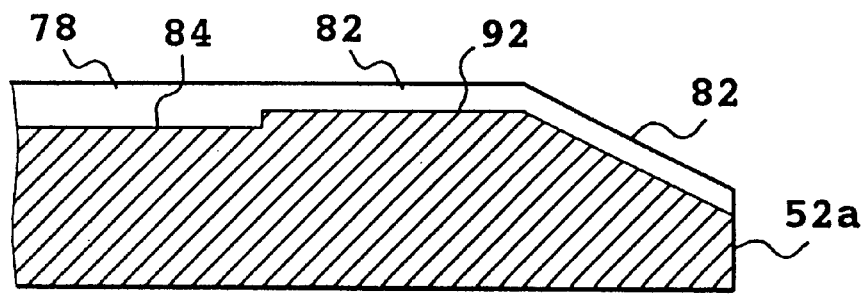
FIG. 15B is a cross section taken along the line B—B in FIG. 15A.

FIG. 15A is a plan view of a slider 50K showing an eleventh preferred embodiment of the present invention, and FIG. 15B is a cross section taken along the line B—B in FIG. 15A. A slit 92 is formed at the rail connecting portion 86 so as to extend from the air outlet end 52b side to the air inlet end 52a. The slit 92 is shallower than the groove 84. Accordingly, a negative pressure can be easily generated, and the current of air compressed in the slit 92 is prevented from being rapidly expanded in the groove 84, thereby preventing deposition of dust on the surface of the groove 84.

Figure 16:
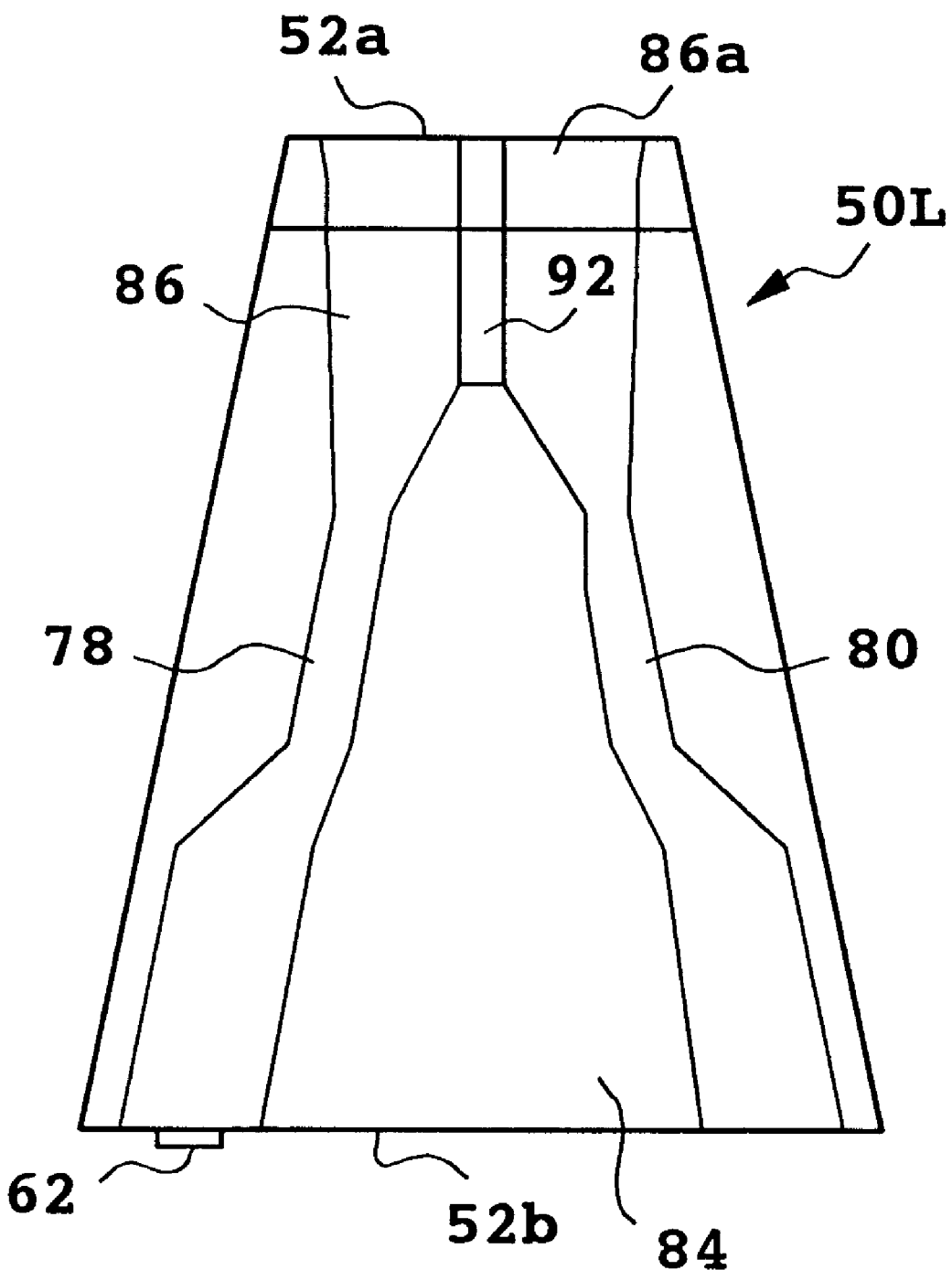
FIG. 16 is a plan view of a slider showing a twelfth preferred embodiment of the present invention.

FIG. 16 is a plan view of a slider 50L showing a twelfth preferred embodiment of the present invention. In this preferred embodiment, the width of the tapering surface 86a at the rail connecting portion 86 is decreased from the air inlet end 52a toward the air outlet end 52b. Accordingly, even when the length of the tapering surface varies due to a taper working tolerance, variations in flying height of the slider 50L can be reduced.

Figure 17:
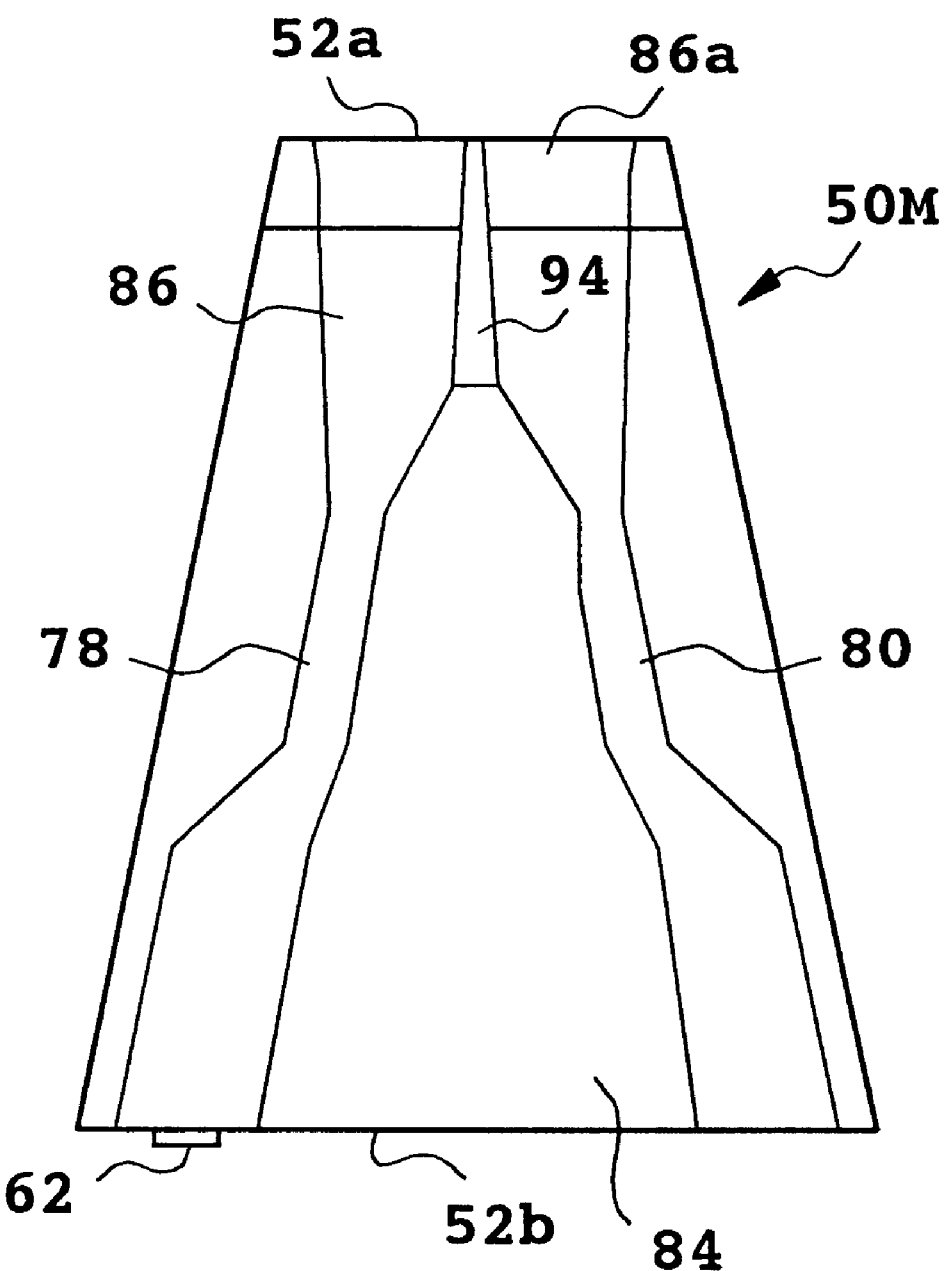
FIG. 17 is a plan view of a slider showing a thirteenth preferred embodiment of the present invention.

FIG. 17 is a plan view of a slider 50M showing a thirteenth preferred embodiment of the present invention. In this preferred embodiment, a slit 94 is formed at the rail connecting portion 86 so as to extend from the air outlet end 52b side to the air inlet end 52a. The slit 94 is shallower than the groove 84, and the width of the slit 94 is gradually increased from the air inlet end 52a toward the air outlet end 52b. Further, the width of the tapering surface 86a is decreased from the air inlet end 52a toward the air outlet end 52b. Accordingly, even when the length of the tapering surface varies due to a taper working tolerance, variations in flying height of the slider 50M can be reduced.

Figure 18:
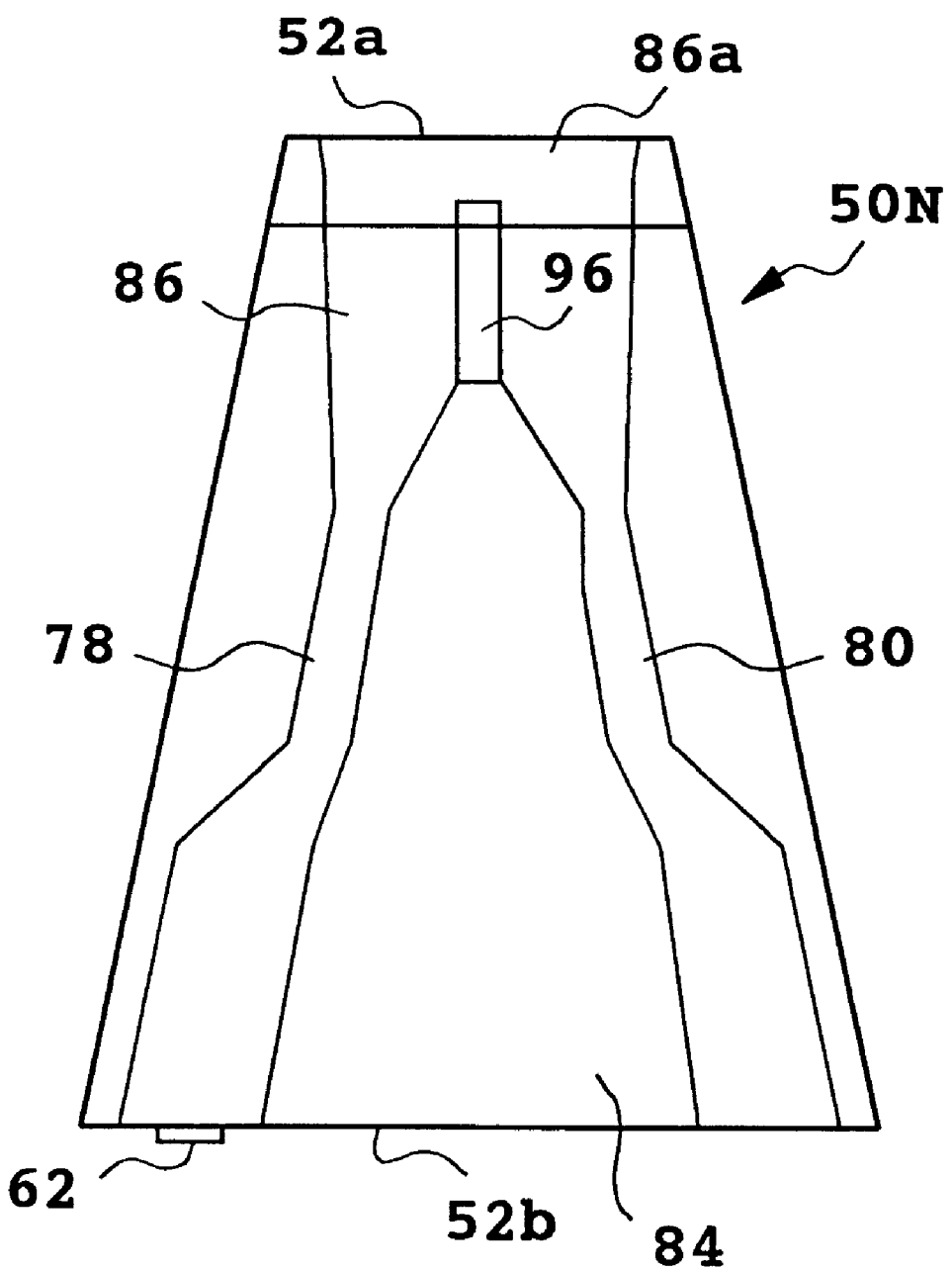
FIG. 18 is a plan view of a slider showing a fourteenth preferred embodiment of the present invention.

FIG. 18 is a plan view of a slider 50N showing a fourteenth preferred embodiment of the present invention. In this preferred embodiment, a slit 96 is formed at the rail connecting portion 86 so as to extend from the air outlet end 52b side to a part of the tapering surface 86a. The slit 96 is shallower than the groove 84. According to the slider 50N of this preferred embodiment, a negative pressure can be easily generated, and a low flying height can be easily realized.

Figure 19A:
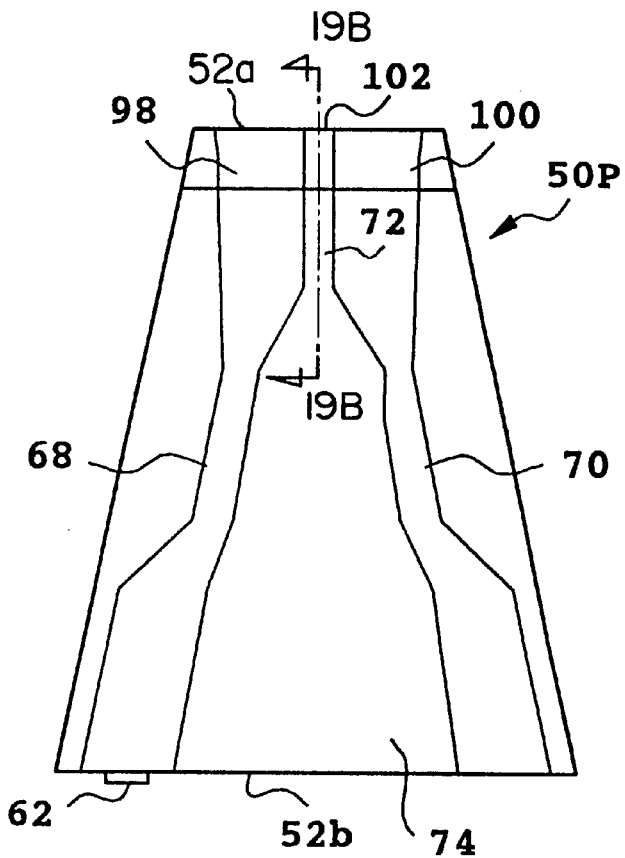
FIG. 19A is a plan view of a slider showing a fifteenth preferred embodiment of the present invention.
Figure 19B:
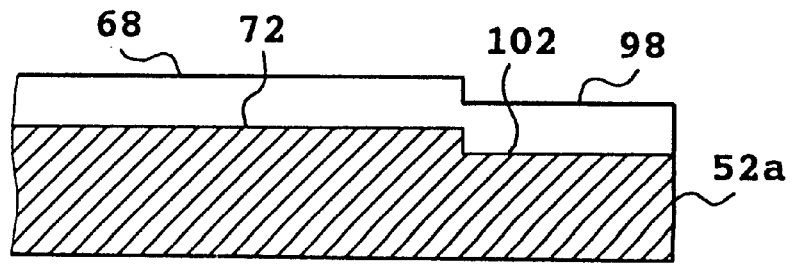
FIG. 19B is a cross section taken along the line B—B in FIG. 19A.

FIG. 19A is a plan view of a slider 50P showing a fifteenth preferred embodiment of the present invention, and FIG. 19B is a cross section taken along the line B—B in FIG. 19A. In each previous preferred embodiment except the third preferred embodiment shown in FIG. 7, the rail surface is tapered at its air inlet end portion, so as to generate a positive pressure at this portion. In contrast therewith, this preferred embodiment employs steps 98 and 100 formed at the air inlet end portions of the rails 68 and 70. Each of the steps 98 and 100 has a depth about ½ to ¼ of the depth of the groove 74 (e.g., 0.5 to 2 μm in the case that the depth of the groove 74 is 2 to 4 μm). Further, a step 102 is formed at the air inlet end portion of the slit 72.

A positive pressure is generated at the steps 98 and 100 formed at the air inlet end portions of the rails 68 and 70. In comparison with the conventional rectangular slider, the width of the air inlet end 52a in the slider 50P of this preferred embodiment is smaller. Accordingly, the amount of deposition of dust can be reduced to thereby allow a reduction in variations in flying height of the slider 50P.

Figure 20:
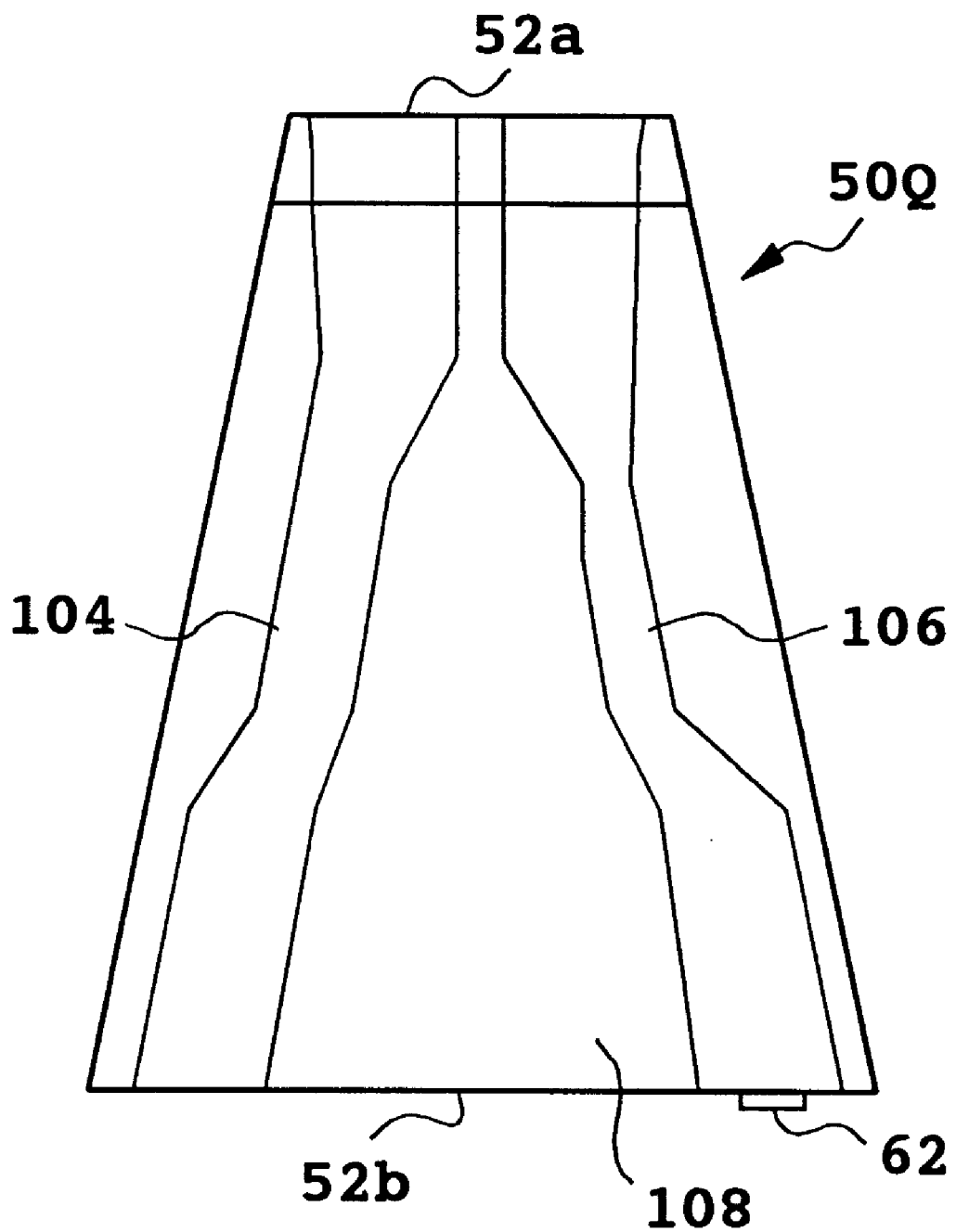
FIG. 20 is a plan view of a slider showing a sixteenth preferred embodiment of the present invention.

FIG. 20 is a plan view of a slider 50Q showing a sixteenth preferred embodiment of the present invention. The slider 50Q has a pair of rails 104 and 106 different in average rail width. That is, the average rail width of the rail 106 where the electromagnetic transducer 62 is positioned is smaller than the average rail width of the rail 104, so that the flying height of the rail 106 where the electromagnetic transducer 62 is positioned is reduced more. Accordingly, the probability that the slider 50Q may come into contact with the magnetic disk during flying at a low height can be reduced. A groove 108 is defined between the rails 104 and 106.

Figure 21:
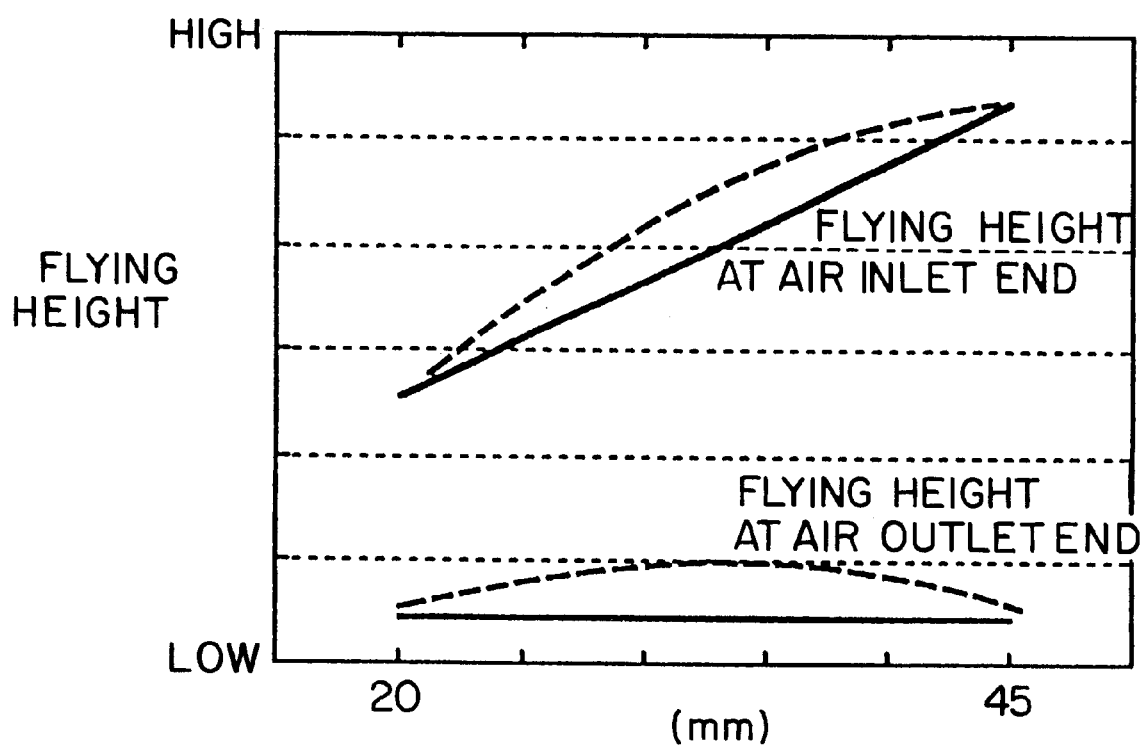
FIG. 21 is a graph showing the flying height of the slider shown in FIG. 20.

FIG. 21 is a graph showing the flying heights of the slider 50Q at its air inlet end and its air outlet end according to the sixteenth preferred embodiment. In FIG. 21, the vertical axis represents the flying height of the slider 50Q, and the horizontal axis represents the radial distance from the center of the magnetic disk. The solid line shows the flying height of the rail 106 where the electromagnetic transducer 62 is positioned, and the broken line shows the flying height of the rail 104 where no electromagnetic transducer is positioned. As apparent from FIG. 21, the flying height of the rail 106 is lower than that of the rail 104 both at the air inlet end and at the air outlet end.

Figure 22A:
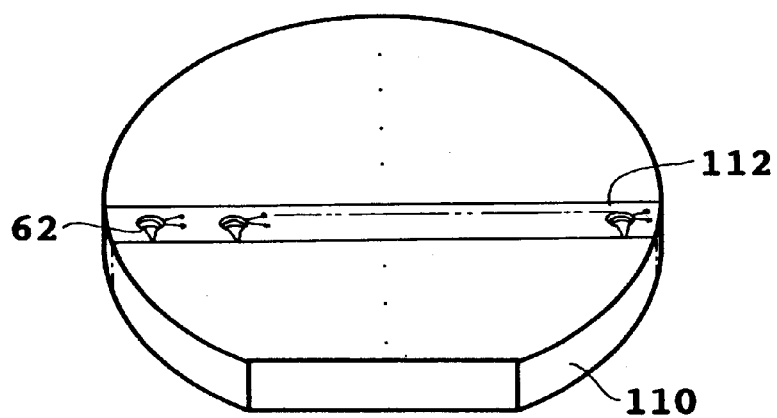
FIG. 22A is a perspective view of a wafer.
Figure 22B:
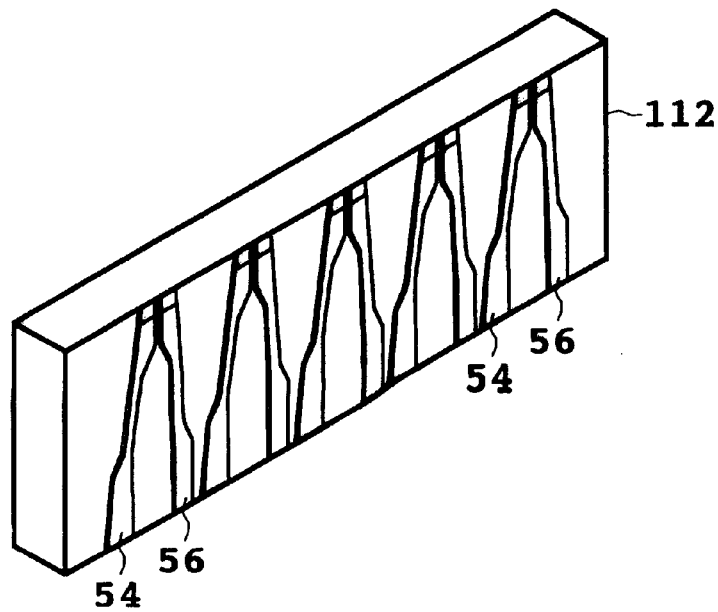
FIG. 22B is a perspective view of a sticklike wafer cut from the wafer shown in FIG. 22A.

There will now be described a manufacturing method for a slider in brief with reference to FIGS. 22A and 22B. As shown in FIG. 22A, a plurality of electromagnetic transducers 62 are first formed on a wafer 110. The wafer 110 is next cut into a plurality of bar-shaped $Al_2O_3$—TiC substrates 112 each having the electromagnetic transducers 62 arranged in a line. In this specification, each substrate 112 will be referred to as a sticklike wafer. Then, a mask pattern of photoresist is formed on the sticklike wafer 112, and the sticklike wafer 112 is etched by ion milling to thereby form a plurality of pairs of rails 54 and 56 on the sticklike wafer 112.

Figure 23:
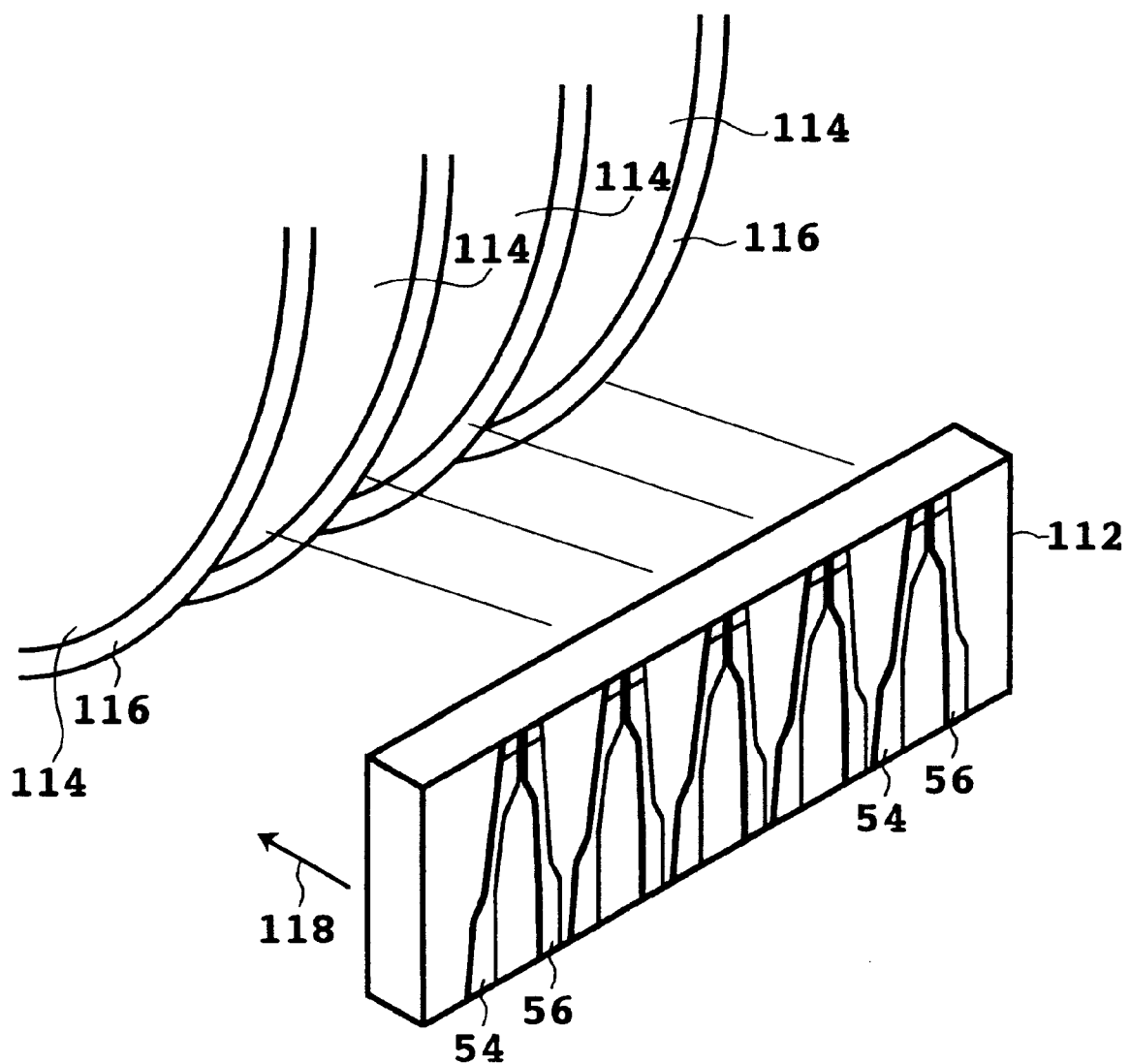
FIG. 23 is a perspective view showing a first cutting method.
Figure 24:
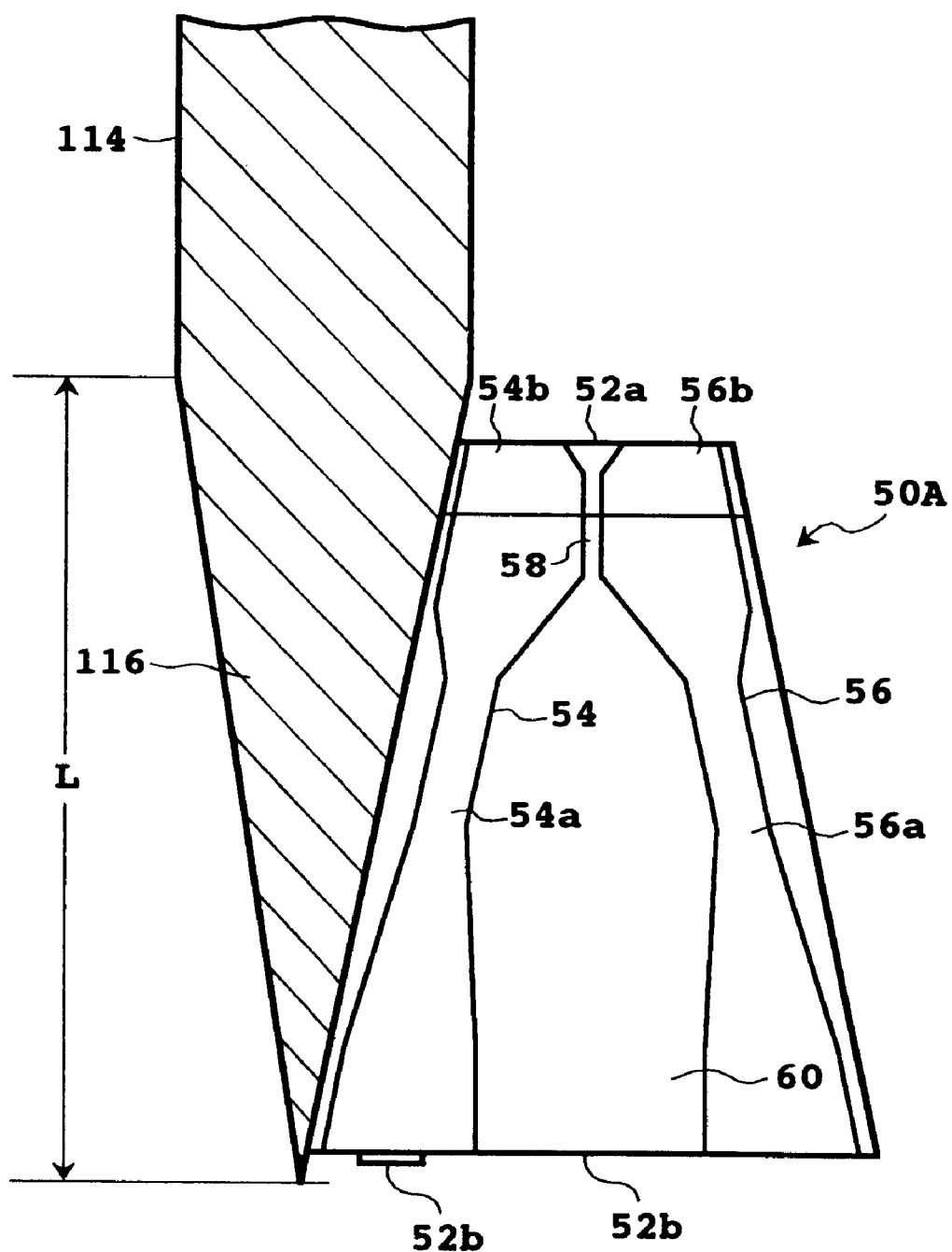
FIG. 24 is a sectional view showing the shape of a cutting blade.

Referring to FIG. 23, there is shown a first cutting method for the sticklike wafer 112. Since the slider of the present invention has a trapezoidal shape, a special cutting method is required to cut the sticklike wafer 112 into individual trapezoidal sliders. The first cutting method uses a plurality of rotary cutters 114 each having a cutting blade 116 over the outer circumference. The cutting blade or cutting edge 116 has a special sectional shape as shown in FIG. 24. That is, the cutting blade 116 has an inclination angle equal to the angle of the inclined side surface of the trapezoidal slider 50A. Further, the cutting blade 116 has a radial length L larger than the length of the trapezoidal slider 50A, that is, the width of the sticklike wafer 112.

As shown in FIG. 23, the plural rotary cutters 114 each having the specific cutting blade 116 as mentioned above are juxtaposed at equal intervals. The sticklike wafer 112 is made upright so that the air inlet end 52a of each slider 50A becomes an upper side, and the sticklike wafer 112 in such an upright condition is fed to the cutters 114 in a horizontal direction shown by an arrow 118, thereby cutting the sticklike wafer 112 into the individual sliders 50A.

In this cutting method, it is important to take into account the relation between the height of the sticklike wafer 112 and the height of the cutting blade 116 of each cutter 114 during feeding the sticklike wafer 112. That is, the sticklike wafer 112 is fed so that the relation in height as shown in FIG. 24 is obtained at a position immediately below the cutters 114. When the sticklike wafer 112 passes the position immediately below the cutters 114, the sticklike wafer 112 is cut into the plural trapezoidal sliders 50A.

Figure 25:
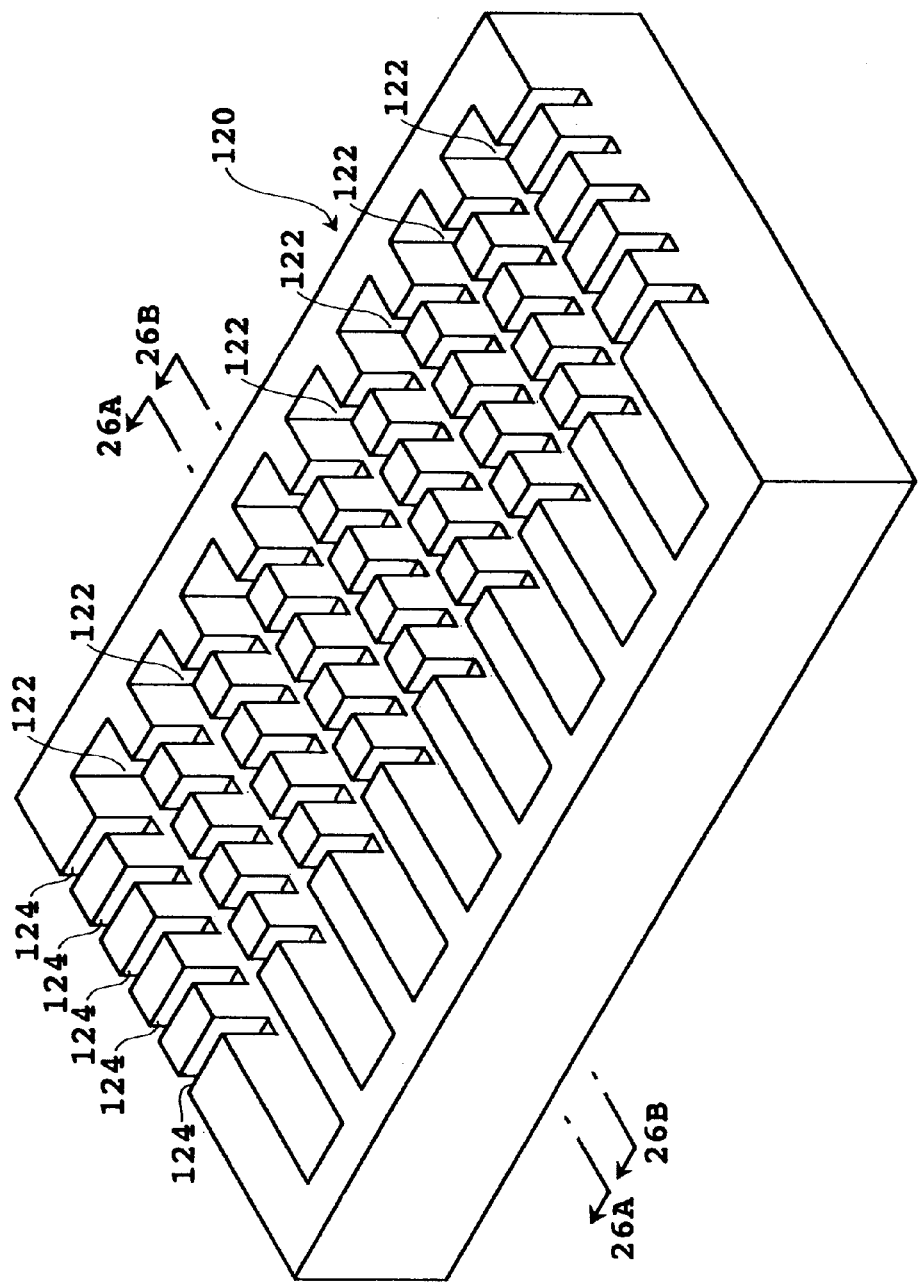
FIG. 25 is a perspective view of a stage.
Figure 26A:
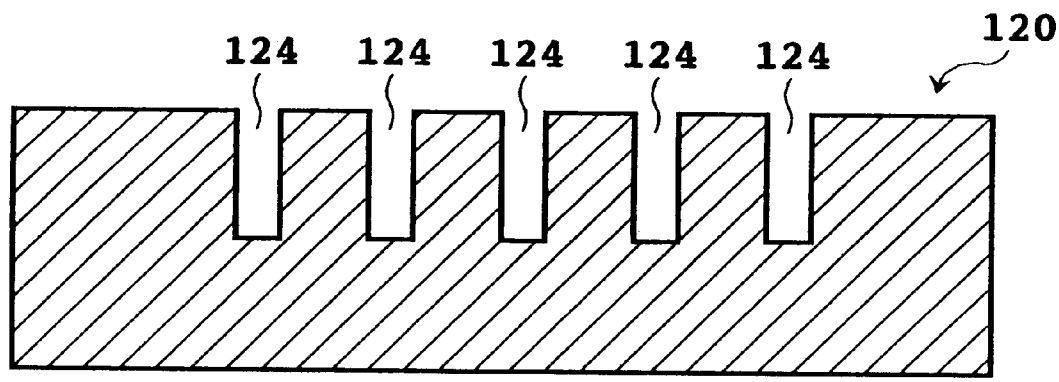
FIG. 26A is a cross section taken along the line 26A—26A in FIG. 25.
Figure 26B:
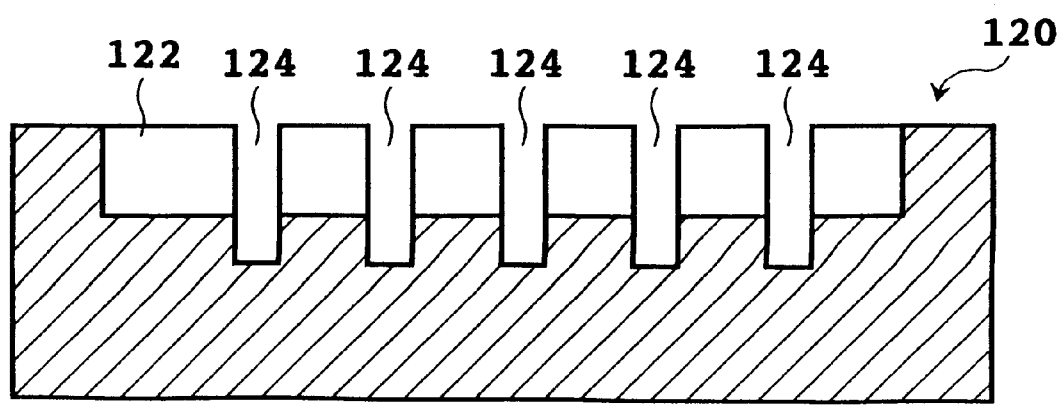
FIG. 26B is a cross section taken along the line 26B—26B in FIG. 25.

To automate the cutting of the sticklike wafer 112, a stage 120 as shown in FIG. 25 is used. The stage 120 has a plurality of grooves 122 each for just receiving the sticklike wafer 112. The stage 120 further has a plurality of slits 124 perpendicular to each groove 122, for allowing pass of the cutting blades 116. FIG. 26A is a cross section taken along the line 26A—26A in FIG. 25, and FIG. 26B is a cross section taken along the line 26B—26B in FIG. 25.

In cutting the plural sticklike wafers 112 by using the stage 120, the sticklike wafers 112 are inserted into the grooves 122 of the stage 120 in such a manner that the air inlet ends of the sliders 50A of each sticklike wafer 112 become an upper side. Then, the stage 120 is horizontally fed by means of a carrier to cut each sticklike wafer 112 into the individual sliders 50A. In cutting each sticklike wafer 112, the cutting blades 116 of the rotary cutters 114 are passed through the slits 124 of the stage 120.

Figure 27:
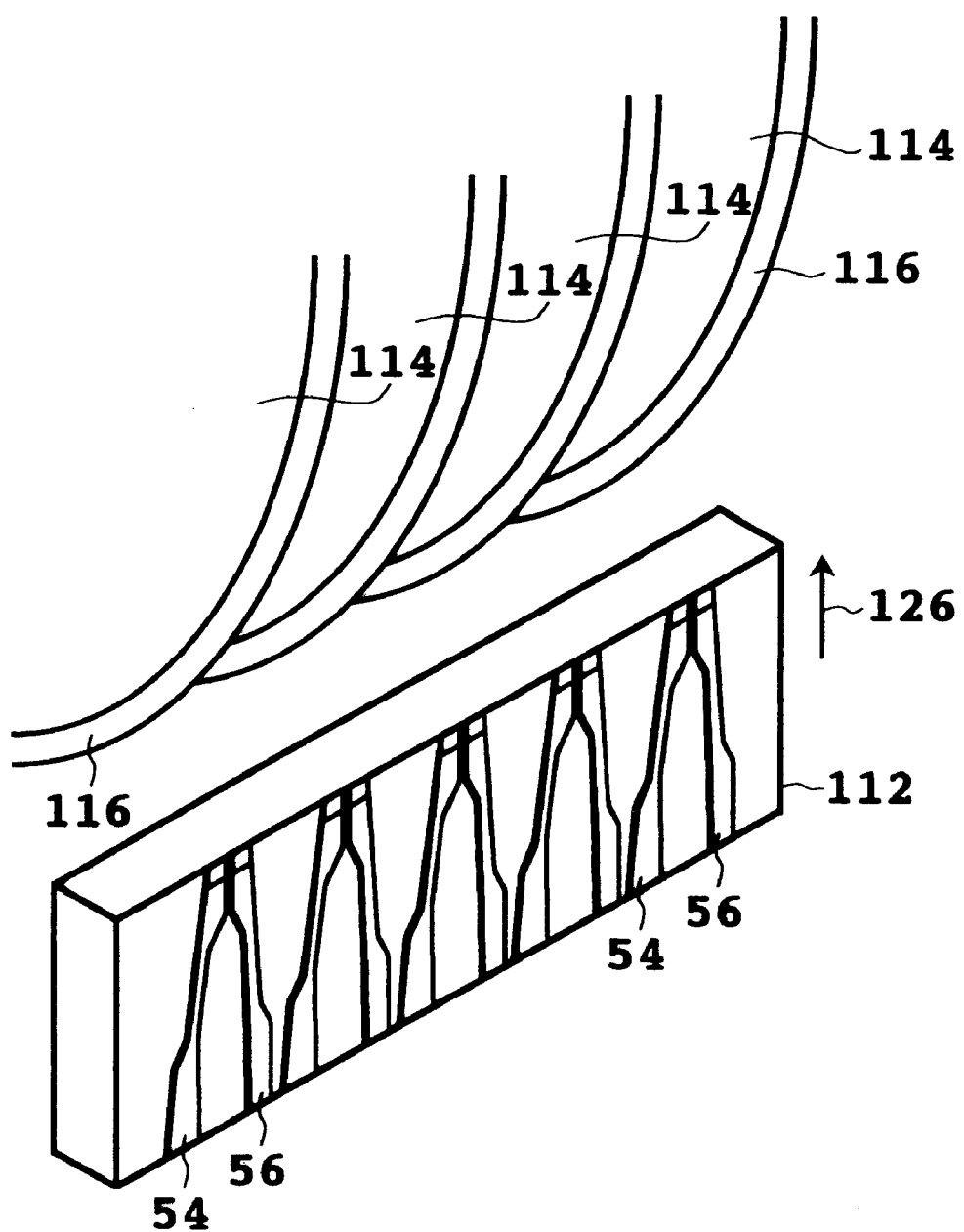
FIG. 27 is a perspective view showing a second cutting method.

Referring next to FIG. 27, there is shown a second cutting method for the sticklike wafer 112. According to this cutting method, the sticklike wafer 112 is made upright so that the air inlet end 52a of each slider 50A becomes an upper side, and is positioned immediately below the rotary cutters 114. Then, the sticklike wafer 112 is moved upward in a vertical direction to the cutters 114 so that a cutting position substantially lies on a vertical line passing through the center of each cutter 114, thereby cutting the sticklike wafer 112 into the individual sliders 50A. The cutting blade 116 of each cutter 114 has a shape similar to that shown in FIG. 24.

Figure 28:
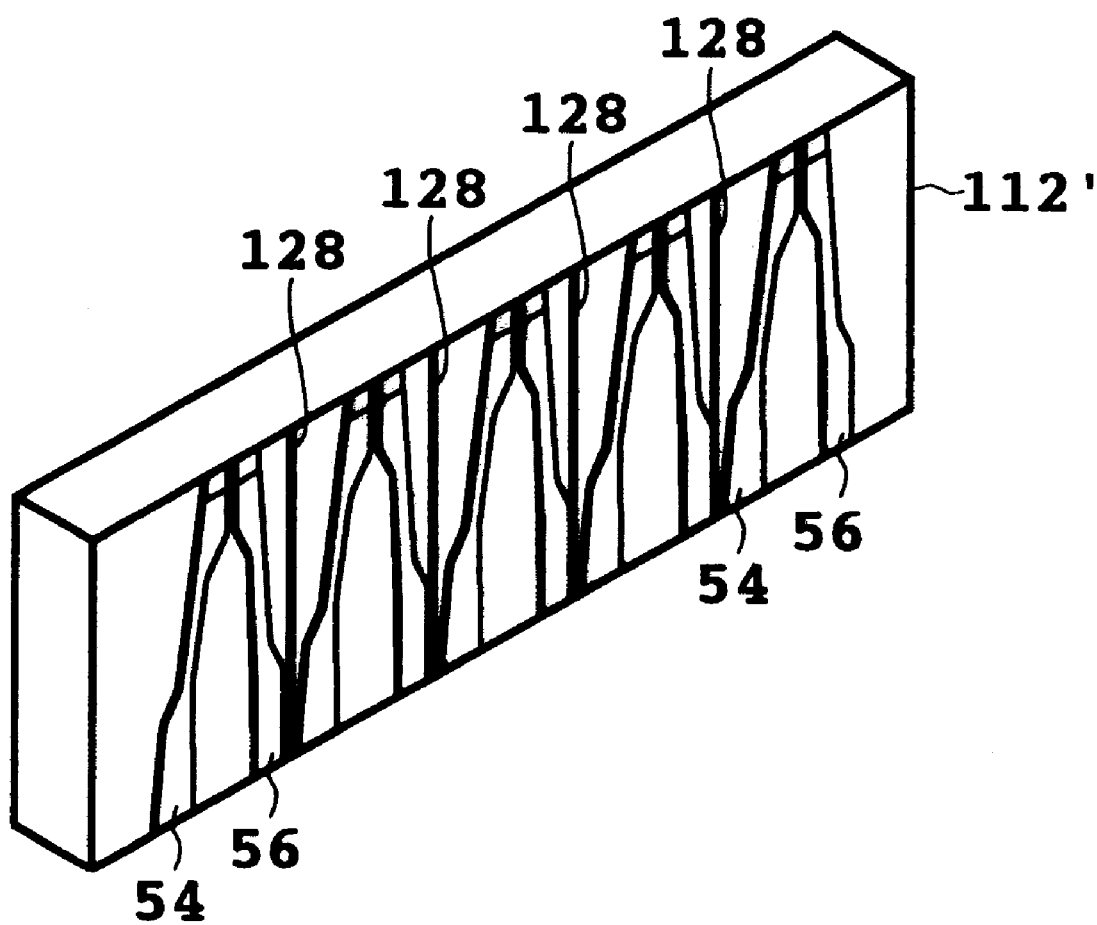
FIG. 28 is a perspective view of a sticklike wafer suitable for positioning of cutting blades.

Referring next to FIG. 28, there is shown a sticklike wafer 112' suitable for positioning of the cutting blades 116. The sticklike wafer 112' has a plurality of ribs 128 extending over the width of the sticklike wafer 112' (i.e., the length of each slider). Each rib 128 is located between adjacent sliders. The ribs 128 are formed simultaneously with formation of the rails 54 and 56 by ion milling. Since the sticklike wafer 112' has the plural ribs 128, the ribs 128 can be used as guides for positioning the cutting blades 116 of the cutters 114. By cutting the sticklike wafer 112' with the ribs 128 used as the guides, the sticklike wafer 112' can be easily separated into the individual sliders.

According to the present invention, it is possible to provide a head slider having good flying characteristics which can suppress variations in flying height due to a rail surface planarity tolerance in working a slider and variations in flying height due to a taper working tolerance.

What is claimed is:

1. A head slider having an air inlet end and an air outlet end, comprising:

a pair of rails formed on a surface opposed to a disk, each of said rails having a flat air bearing surface for generating a flying force during rotation of said disk, each of said rails having an air inlet end portion, and air outlet end portion and an intermediate portion;

a slit defined between said rails at their air inlet end portions whereby air which enters said slit is compressed;

a groove defined between said rails which is continuous to said slit and wider than said slit, for expanding said compressed air to generate a negative pressure; and a transducer formed on said air outlet end at a position where one of said rails is located;

wherein said slider has a pair of substantially parallel side surfaces intersecting said air outlet end and a pair of inclined side surfaces extending from said pair of substantially parallel side surfaces to said air inlet end so as to continuously approach each other.

2. A head slider according to claim 1, wherein the width of each of said rails decreases from said air inlet end portion toward said intermediate portion and then increases from said intermediate portion toward said air outlet end portion.

3. A head slider according to claim 1, wherein each of said rails has a tapering surface formed continuously to said air bearing surface at said air inlet end portion, said tapering surface having a width continuously increasing from said air inlet end portion toward said air outlet end portion.

4. A head slider according to claim 3, wherein opposed inner side surfaces of said pair of rails are parallel to a longitudinally extending center line of said slider at said air inlet end portions where said tapering surfaces are formed.

5. A head slider having an air inlet end and an air outlet end, comprising:
   a pair of rails formed on a surface opposed to a disk, each of said rails having a flat air bearing surface for generating a flying force during rotation of said disk, said rails being spaced a distance apart from each other that increases from said air inlet end toward said air outlet end,
   wherein each of said rails has an air inlet end portion, an air outlet end portion and an intermediate portion;
   a transducer formed on said air outlet end at a position where one of said rails is located; and
   wherein said head slider has a trapezoidal shape such that said air inlet end is narrower than said air outlet end, and said head slider is supported by air flow substantially at three points while in flight over said disk,
   wherein said air outlet end of said slider further has a midpoint located between sides of said slider, each said side connecting said air outlet end to said air inlet end, and
   wherein each of said rails has a center of said air outlet end portion being positioned outside of a straight line connecting a center of said air inlet end portion and a center of said intermediate portion so that each said air outlet end portion is farther away from said midpoint of said air outlet end than a corresponding said straight line.

6. A head slider having an air inlet end and an air outlet end, comprising:
   a pair of rails formed on a surface opposed to a disk, each of said rails having a flat air bearing surface for generating a flying force during rotation of said disk,
   wherein each of said rails has an air inlet end portion, an air outlet end portion and an intermediate portion, each of said rails being substantially parallel to a corresponding side edge of said slider;
   a groove defined between said rails, whereby air which is compressed upstream of said groove is expanded to generate a negative pressure;
   a transducer formed on said air outlet end at a position where one of said rails is located;
   said head slider having a trapezoidal shape such that said air inlet end is narrower than said air outlet end, and said head slider is supported by air flow substantially at three points while in flight over said disk,
   wherein said air outlet end of said slider further has a midpoint located between sides of said slider, each said side connecting said air outlet end to said air inlet end, and
   wherein each of said rails has a center of said air outlet end portion being positioned outside of a straight line connecting a center of said air inlet end portion and a center of said intermediate portion so that each said air outlet end portion is farther away from said midpoint of said air outlet end than a corresponding said straight line.

7. A disk drive comprising:
   a housing;
   a disk rotatably mounted in said housing;
   a head slider having an air inlet end and an air outlet end and having a transducer for reading/writing data from/to said disk;
   and an actuator for moving said head slider across tracks of said disk;
   said head slider comprising:
   a pair of rails formed on a surface opposed to said disk, each of said rails having a flat air bearing surface for generating a flying force during rotation of said disk, wherein each of said rails has an air inlet end portion, an air outlet end portion and an intermediate portion;
   a slit defined between said pair of rails at their air inlet end portions;
   and a groove defined between said pair of rails which is continuous to said slit and wider than said slit, whereby air which is compressed upstream of said groove is expanded to generate a negative pressure;
   said transducer being formed on said air outlet end of said slider at a position where one of said rails is located;
   and wherein said slider has a trapezoidal shape such that said air inlet end is narrower than said air outlet end, and said head slider is supported substantially at three points while in flight over said disk,
   wherein said air outlet end of said slider further has a midpoint located between sides of said slider, each said side connecting said air outlet end to said air inlet end, and
   wherein each of said rails a center of said air outlet end portion being positioned outside of a straight line connecting a center of said air inlet end portion and a center of said intermediate portion so that each said air outlet end portion is farther away from said midpoint of said air outlet end than a corresponding said straight line.

8. A head slider having an air inlet end and an air outlet end, comprising:
   a pair of rails formed on a surface opposed to a disk, each of said rails having a flat air bearing surface for generating a flying force during rotation of said disk, said rails being spaced a distance apart from each other that increases from said air inlet end toward said air outlet end,
   wherein each of said rails has an air inlet end portion, an air outlet end portion and an intermediate portion;
   a transducer formed on said air outlet end at a position where one of said rails is located;
   wherein said head slider has a trapezoidal shape such that said air inlet end is narrower than said air outlet end, and said head slider is supported by air flow substantially at three points while in flight over said disk,
   each of said rails further having a tapering surface formed continuously to said air bearing surface at said air inlet end portion, said tapering surface having a width continuously decreasing from said air inlet end portion toward said air outlet end portion
   a slit defined between said pair of rails at their air inlet end portions whereby air that enters said slit is compressed; and
   a groove defined between said pair of rails which is continuous to said slit and wider than said slit, for expanding said compressed air to generate a negative pressure, and wherein said air outlet end of said slider further has a midpoint located between sides of said slider, each said side connecting said air outlet end to said air inlet end, and wherein each of said rails has a center of said air outlet end portion being positioned outside of a straight line connecting a center of said air inlet end portion and a center of said intermediate portion so that said air outlet end portion is farther away from said midpoint of said air outlet end than said straight line.

9. A head slider having an air inlet end and an air outlet end, comprising:

a pair of rails formed on a surface opposed to a disk, each of said rails having a flat air bearing surface for generating a flying force during rotation of said disk, said rails being spaced a distance apart from each other that increases from said air inlet end toward said air outlet end, wherein each of said rails has an air inlet end portion, an air outlet end portion and an intermediate portion;

a transducer formed on said air outlet end at a position where one of said rails is located;

wherein said head slider has a trapezoidal shape such that said air inlet end is narrower than said air outlet end, and said head slider is supported by air flow substantially at three points while in flight over said disk, each of said rails further having a tapering surface formed continuously to said air bearing surface at said air inlet end portion, said tapering surface having a width continuously decreasing from said air inlet end portion toward said air outlet end portion, a slit defined between said pair of rails at their air inlet end portions whereby air that enters said slit is compressed; and a groove defined between said pair of rails which is continuous to said slit and wider than said slit, for expanding said compressed air to generate a negative pressure, and wherein opposed inner side surfaces of said pair of rails are parallel to a longitudinally extending center line of said slider at said air inlet end portions where said tapering surfaces are formed.

* * * * *

UNITED STATES PATENT AND TRADEMARK OFFICE
CERTIFICATE OF CORRECTION

PATENT NO. : 6,157,518
DATED : December 5, 2000
INVENTOR(S) : Koishi et al.

Page 1 of 1

It is certified that error appears in the above-identified patent and that said Letters Patent is hereby corrected as shown below:

Claim 7,
Line 31, after "rails" insert -- has --.

Signed and Sealed this

Eleventh Day of December, 2001

Attest:

NICHOLAS P. GODICI
Attesting Officer
Acting Director of the United States Patent and Trademark Office